(12) United States Patent
Jeong et al.

(10) Patent No.: US 11,102,614 B2
(45) Date of Patent: Aug. 24, 2021

(54) APPARATUS AND METHOD FOR PROVIDING SERVICE IN A MOBILE COMMUNICATION SYSTEM

(71) Applicant: Samsung Electronics Co., Ltd., Suwon-si (KR)

(72) Inventors: Sang-Soo Jeong, Suwon-si (KR); Hye-Jeong Kim, Suwon-si (KR); Song-Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 14/654,697

(22) PCT Filed: Feb. 6, 2015

(86) PCT No.: PCT/KR2015/001238
§ 371 (c)(1),
(2) Date: Jun. 22, 2015

(87) PCT Pub. No.: WO2015/119452
PCT Pub. Date: Aug. 13, 2015

(65) Prior Publication Data
US 2016/0262058 A1    Sep. 8, 2016

(30) Foreign Application Priority Data

Feb. 7, 2014   (KR) .................. 10-2014-0014353
Mar. 6, 2014   (KR) .................. 10-2014-0026825
Jun. 18, 2014  (KR) .................. 10-2014-0074338

(51) Int. Cl.
*H04W 4/02*    (2018.01)
*H04W 60/00*   (2009.01)
*H04W 36/00*   (2009.01)

(52) U.S. Cl.
CPC .......... *H04W 4/025* (2013.01); *H04W 60/00* (2013.01); *H04W 36/0022* (2013.01)

(58) Field of Classification Search
CPC ..... H04W 60/00; H04W 36/00; H04W 4/025; H04W 36/0022
(Continued)

(56) References Cited

U.S. PATENT DOCUMENTS

2010/0296421 A1    11/2010   Watfa et al.
2010/0329243 A1    12/2010   Buckley et al.
(Continued)

FOREIGN PATENT DOCUMENTS

CN    102388661 A    3/2012
CN    102474810 A    5/2012
(Continued)

OTHER PUBLICATIONS

Ericsson; CS domain and IM CN Subsystem selection principles; 3GPP TSG-SA WG2 Meeting #73; S2-094178; XP050347113; May 11-15, 2009;Tallinn, Estonia.
(Continued)

*Primary Examiner* — Charles N Appiah
*Assistant Examiner* — Frank E Donado
(74) *Attorney, Agent, or Firm* — Jefferson IP Law, LLP

(57) ABSTRACT

A method for receiving a service by a user equipment (UE) is provided. The method includes transmitting an attach request message to a network, upon detection of entry into an area of a non-legacy mobile communication system, receiving an attach accept message from the network including information indicating whether the network supports VoIP or CSFB and receiving voice service by the VoIP or the CSFB through the non-legacy mobile communication system if the information included in the attach accept message indicates that the network supports the VoIP or the CSFB.

12 Claims, 14 Drawing Sheets

(58) Field of Classification Search
USPC .................................................. 455/435.1
See application file for complete search history.

(56) References Cited

U.S. PATENT DOCUMENTS

| | | | |
|---|---|---|---|
| 2010/0329244 A1* | 12/2010 | Buckley | H04W 76/16 370/352 |
| 2012/0014381 A1* | 1/2012 | Dwyer | H04W 48/18 370/352 |
| 2012/0044867 A1* | 2/2012 | Faccin | H04W 60/00 370/328 |
| 2012/0087340 A1* | 4/2012 | Yang | H04W 36/0022 370/331 |
| 2012/0157100 A1 | 6/2012 | Suzuki et al. | |
| 2012/0189016 A1* | 7/2012 | Bakker | H04W 76/11 370/401 |
| 2012/0246325 A1* | 9/2012 | Pancorbo Marcos | H04L 63/102 709/227 |
| 2013/0083777 A1 | 4/2013 | Rydnell et al. | |
| 2013/0142168 A1 | 6/2013 | Vedrine et al. | |
| 2013/0183965 A1 | 7/2013 | Ramachandran et al. | |
| 2013/0265954 A1* | 10/2013 | Dahlen | H04W 48/18 370/329 |
| 2013/0279475 A1* | 10/2013 | Nishida | H04W 36/14 370/331 |
| 2013/0295930 A1 | 11/2013 | Tiwari | |
| 2013/0315072 A1 | 11/2013 | Hietalahti et al. | |
| 2013/0322302 A1* | 12/2013 | Gholmieh | H04W 36/24 370/280 |
| 2013/0336127 A1 | 12/2013 | Wu | |
| 2014/0016562 A1 | 1/2014 | Watfa et al. | |
| 2014/0133464 A1* | 5/2014 | Li | H04L 47/767 370/331 |
| 2014/0146685 A1* | 5/2014 | Faccin | H04W 60/00 370/241 |
| 2014/0162661 A1* | 6/2014 | Shaw | H04W 36/22 455/439 |
| 2014/0376360 A1* | 12/2014 | Lisak | H04L 49/557 370/218 |
| 2015/0056986 A1* | 2/2015 | Kim | H04L 65/103 455/432.1 |
| 2015/0131619 A1* | 5/2015 | Zhu | H04W 36/0022 370/332 |
| 2016/0323813 A1* | 11/2016 | Chen | H04W 36/0022 |

FOREIGN PATENT DOCUMENTS

| | | |
|---|---|---|
| CN | 102484849 A | 5/2012 |
| CN | 103026775 A | 4/2013 |
| CN | 103391578 A | 11/2013 |
| EP | 2654282 A1 | 10/2013 |
| KR | 10-2012-0030540 A | 3/2012 |
| KR | 10-2013-0046649 A | 5/2013 |
| WO | 2012/135994 A1 | 10/2012 |
| WO | 2013/052030 A2 | 4/2013 |

OTHER PUBLICATIONS

3GPP; 3rd Generation Partnership Project; Technical Specification Group Core Network and Terminals; Non-Access-Stratum (NAS) protocol for Evolved Packet System (EPS); Stage 3 (Release 12); 3GPP TS 24.301; V12.3.0; XP050729087; Dec. 2013; Valbonne, France.

Research in Motion UK Limited; SMS over SGs and provisioning of CSFB services to Data Centric UEs; 3GPP TSG WG2 Meeting #75; S2-095066; Aug. 31-Sep. 4, 2009; Kyoto, Japan.

Ericsson et al.; Serving nodes in case of rSRVCC; 3GPP TSG SA WG2 Meeting #83; S2-110847; Feb. 21-25, 2011; Salt Lake City, Utah.

3GPP; 3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 11); 3GPP TR 23.885; V11.0.0; Sep. 2011; Valbonne, France.

Nsn et al.; On the need of HRL and SNA Access Information during UE Radio Capability Match; 3GPP TSG-RAN WG3 Meeting #81; R3-131397; Aug. 19-23, 2013; Barcelona, Spain.

3GPP; 3rd Generation Partnership Project; Technical Specification Group Services and System Aspects; Single Radio Voice Call Continuity (SRVCC); Stage 2 (Release 12); 3GPP TS 23.216; V12.0.0; Dec. 2013; Valbonne, France.

Chinese Office Action dated Dec. 19, 2017, issued in Chinese Patent Application No. 201580000141.6.

Indian Office Action dated Nov. 14, 2019, issued in Indian Patent Application No. 2061/KOLNP/2015.

* cited by examiner

APPARATUS AND METHOD FOR PROVIDING SERVICE IN A MOBILE COMMUNICATION SYSTEM

CROSS-REFERENCE TO RELATED APPLICATION(S)

This application is a U.S. National Stage application under 35 U.S.C. § 371 of an International application filed on Feb. 6, 2015 and assigned application number PCT/KR2015/001238, which claimed the benefit of a Korean patent application filed on Feb. 7, 2014 in the Korean Intellectual Property Office and assigned Serial number 10-2014-0014353, of a Korean patent application filed on Mar. 6, 2014 in the Korean Intellectual Property Office and assigned Serial number 10-2014-0026825, and of a Korean patent application filed on Jun. 18, 2014 in the Korean Intellectual Property Office and assigned Serial number 10-2014-0074338, the entire disclosure of each of which is hereby incorporated by reference.

TECHNICAL FIELD

The present disclosure relates to an apparatus and method for providing a service by adaptively selecting an access network from which voice service and data service will be received in a mobile communication system.

BACKGROUND

In general, mobile communication systems were developed to provide voice service, ensuring the mobility of users. The mobile communication systems have been extending their service ranges to data service in addition to the voice service. Now the mobile communication systems are capable of providing various high-speed large-capacity services to user equipments (UEs).

Major examples of the mobile communication systems include a long term evolution (LTE) mobile communication system, an LTE-advanced (LTE-A) mobile communication system, a high speed downlink packet access (HSDPA) mobile communication system, a high speed uplink packet access (HSUPA) mobile communication system, a $3^{rd}$ generation partnership project 2 (3GPP2) high rate packet data (HRPD) mobile communication system, a 3GPP2 wideband code division multiple access (WCDMA) mobile communication system, a 3GPP2 CDMA mobile communication system, an institute of electrical and electronics engineers (IEEE) 802.16m communication system, an evolved packet system (EPS), and a mobile internet protocol (Mobile IP) system. However, current mobile communication systems face lack of resources and users demand higher-speed services. Therefore, a more advanced mobile communication is required.

To satisfy the demands, the LTE mobile communication system is under development as a future-generation mobile communication system. The LTE mobile communication system seeks high-speed packet communication at a transmission rate of, for example, up to 100 Mbs. To achieve high-speed packet communication in the LTE mobile communication system, many techniques have been discussed. The techniques include, for example, reduction of the number of nodes in a communication path by simplifying the structure of a network and approximation of radio protocols as close to radio channels as possible.

With reference to FIG. 1, the configuration of a general LTE mobile communication system will be described below.

FIG. 1 illustrates the configuration of a general LTE mobile communication system according to the related art.

Referring to FIG. 1, the LTE mobile communication system may include a UE 100, a plurality of evolved node Bs (eNBs), for example, eNBs #1 110-1, #2 110-2, #3 110-3, and #4 110-4, a mobility management entity (MME) 120, and a serving gateway (S-GW) 130.

The UE 100 is connected to an external network through eNBs #1 110-1, #2 110-2, #3 110-3, and #4 110-4, the S-GW 130, and a packet data network (PDN) gateway (P-GW) (not shown).

Each of eNBs #1 110-1, #2 110-2, #3 110-3, and #4 110-4 is a radio access network (RAN) node that corresponds to a radio network controller (RNC) in a universal mobile telecommunications system (UMTS) terrestrial radio access network (UTRAN) system and a base station controller (BSC) in a global system for mobile communications (GSM)/enhanced data rates for GSM evolution (EDGE) RAN (GERAN) system. Herein, eNBs #1 110-1, #2 110-2, #3 110-3, and #4 110-4 are connected to the UE 100 through radio channels and play a similar role to a legacy RNC/BSC. Each of eNBs #1 110-1, #2 110-2, #3 110-3, and #4 110-4 may use a plurality of cells simultaneously.

Since all user traffic including a real-time service such as voice over IP (VoIP) service is transmitted on a shared channel in the LTE mobile communication system, a device, such as an eNB, performs scheduling by collecting state information about UEs.

The MME 120 executes various control functions. One MME may be connected to a plurality of eNBs.

The S-GW 130 provides data bearers. The S-GW 130 generates or removes data bearers under the control of the MME 120.

In addition to the MME 120 and the S-GW 130, a core network (CN) of the LTE mobile communication system may include other nodes such as an application function (AF) entity, a policy charging and rules function (PCRF) entity, and a P-GW (not shown in FIG. 1).

The AF entity exchanges application-related information with a UE at an application level.

The PCRF entity controls a polity related to quality of service (QoS) of a user. The PCRF entity transmits a policy and charging control (PCC) rule corresponding to the policy to the P-GW, for application to the P-GW. The PCRF entity controls overall QoS and charging for traffic.

In general, a path runs from the UE 100 that transmits/receives user data to/from RAN nodes (i.e., eNBs #1 110-1, #2 110-2, #3 110-3, and #4 110-4) to the S-GW 130 and then to the P-GW. In the path, paths between the UE 100 and eNBs #1 110-1, #2 110-2, #3 110-3, and #4 110-4 use radio channels to which resources are severely restricted.

In a wireless communication system such as the LTE mobile communication system, QoS is applicable on an EPS bearer basis. One EPS bearer is used to transmit IP flows having the same QoS requirement. QoS-related parameters may be configured in the EPS bearer, including a QoS class identifier (QCI) and an allocation and retention priority (ARP). The QCI is a parameter indicating a QoS priority defined as an integer value, and the ARP is a parameter used to determine whether to allow or reject creation of a new EPS bearer.

The EPS bearer corresponds to a packet data protocol (PDP) context in a general packet radio service (GPRS) system. One EPS bearer belongs to a PDN connection which may have an access point name (APN) as an attribute. When a PDN connection is created for an IP multimedia subsystem (IMS) service such as voice over LTE (VoLTE), the PDN connection should be created using a known IMS APN.

To support voice calls, an LTE network may use IMS-based VoLTE in a packet switched (PS) manner or by circuit switched fall back (CSFB) reusing a circuit switched (CS) scheme of a $2^{nd}$ Generation (2G)/$3^{rd}$ Generation (3G) system. In the LTE network, VoLTE and voice over IMS (VoIMS) are used interchangeably.

Upon generation of an incoming voice call or an outgoing voice call while a UE is using a network in a wireless communication system, particularly the LTE network in the LTE mobile communication system, a CSFB procedure for switching to a CS network is performed for the voice service. In general, a 2G/3G mobile communication system is a CS network that may provide CS service and an entity responsible for CS service-related control is referred to as a mobile switching center (MSC) or a visitor location register (VLS). The CSFB procedure that provides a switching function for the CS service is performed through a SGs interface between an MSC/VLS and an MME in the LTE mobile communication system.

If the UE moves out of the coverage area of VoIMS service during receiving the VoIMS service, the UE may be switched to a network supporting CS by single radio voice call continuity (SRVCC) to maintain the call. If the SRVCC is applied while the UE is receiving the VoIMS service and data service at the same time, the data service is also provided to the UE through a 2G/3G network. Because the 2G/3G network generally has a lower transmission rate for the data service than the LTE network, the quality of the data service provided to the UE may be degraded.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing a service in a mobile communication system.

Another aspect of the present disclosure is to provide an apparatus and method for providing a service by adaptively selecting an access network from which voice service and data service will be received in a mobile communication system.

Another aspect of the present disclosure is to provide an apparatus and method for providing a service by differentiating an access network from which a user equipment (UE) will receive voice service from an access network from which the UE will receive data service in a mobile communication system.

In accordance with an aspect of the present disclosure, a UE for receiving a service in a mobile communication system is provided. The UE includes a controller configured to execute one or more software modules and a transceiver configured to transmit and receive information with a network. The one or more software modules cause the UE to transmit an attach request message to a network, upon detection of entry into an area of a non-legacy mobile communication system, receive an attach accept message from the network including information indicating whether the network supports voice over Internet protocol (VoIP) or circuit switched fall back (CSFB), and receive voice service by the VoIP or the CSFB through the non-legacy mobile communication system if the information included in the attach accept message indicates that the network supports the VoIP or the CSFB.

In accordance with another aspect of the present disclosure, a method for providing a service by a UE in a mobile communication system is provided. The method includes transmitting an attach request message to a network, upon detection of entry into an area of a non-legacy mobile communication system, receiving an attach accept message from the network including information indicating whether the network supports VoIP or CSFB and receiving voice service by the VoIP or the CSFB through the non-legacy mobile communication system if the information included in the attach accept message indicates that the network supports the VoIP or the CSFB.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
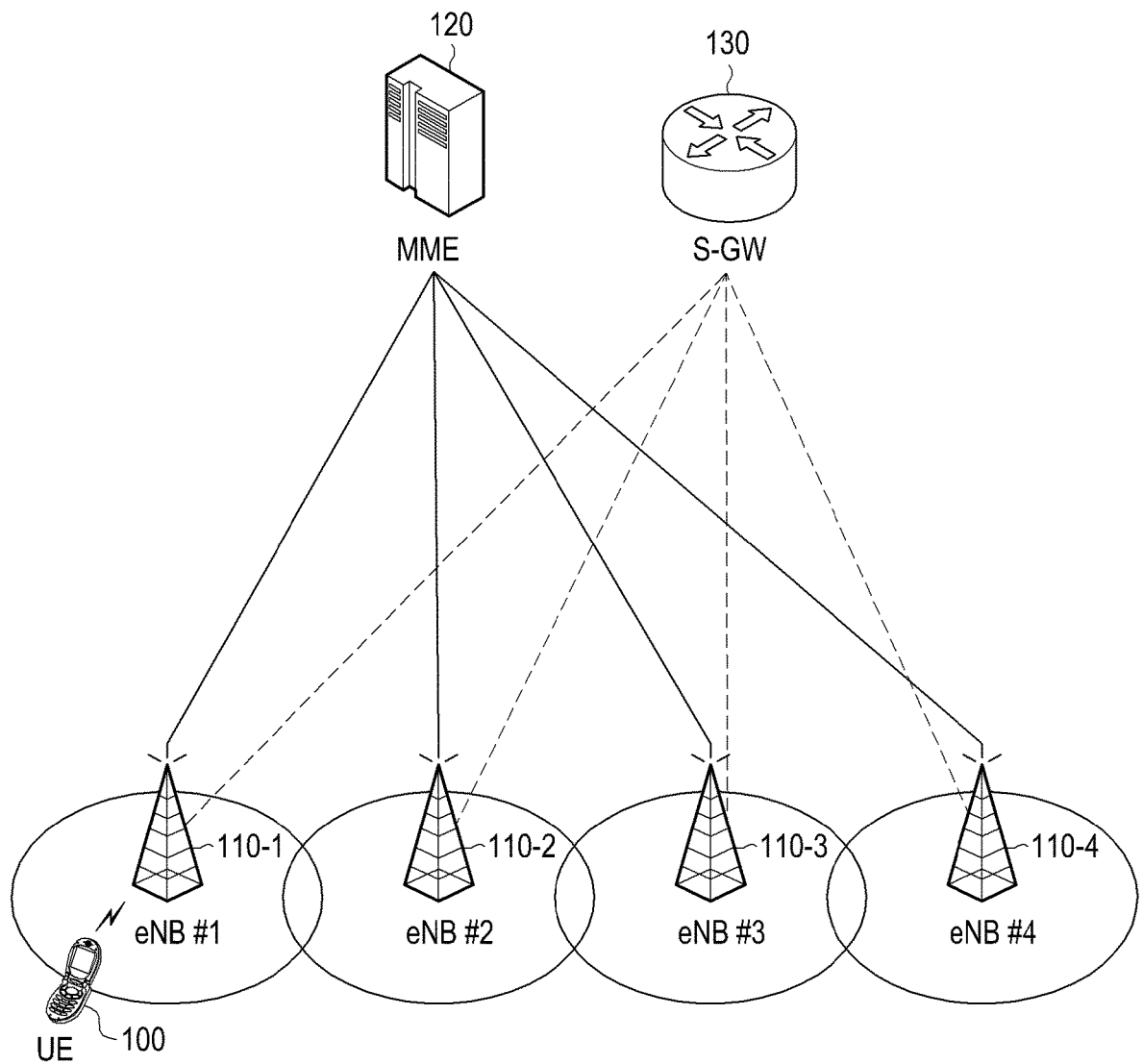
FIG. 1 illustrates the configuration of a general long term evolution (LTE) mobile communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An embodiment of the present disclosure provides an apparatus and method for providing a service in a mobile communication system.

An embodiment of the present disclosure provides an apparatus and method for providing a service by adaptively selecting an access network to receive voice service and data service in a mobile communication system.

An embodiment of the present disclosure provides an apparatus and method for providing a service by differentiating an access network from which a user equipment (UE) will receive voice service from an access network and the UE will receive data service in a mobile communication system.

The methods and apparatuses according to various embodiments of the present disclosure are applicable to various mobile communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a $3^{rd}$ generation partnership project 2 (3GPP2) high rate packet data (HRPD) mobile communication system, a 3GPP2 wideband code division multiple access (WCDMA) mobile communication system, a 3GPP2 CDMA mobile communication system, an Institute of Electrical and Electronics Engineers (IEEE) 802.16m communication system, an evolved packet system (EPS), and a mobile Internet protocol (Mobile IP) system.

The various embodiments of the present disclosure will be described below in which an LTE mobile communication system is a non-legacy mobile communication system and a $2^{nd}$ generation (2G)/$3^{rd}$ generation (3G) mobile communication system is a legacy mobile communication system. However, those skilled in the art will understand that many mobile communication systems other than the LTE mobile communication system may be non-legacy mobile communication systems and many other mobile communication systems other than the 2G/3G mobile communication system may be legacy mobile communication systems.

The various embodiments of the present disclosure will be described in detail in the context of a circuit switched fall back (CSFB) scheme in which a UE switches from an LTE network to a voice over Internet multimedia subsystem (VoIMS) or circuit switched (CS) network, for voice service. However, those skilled in the art will understand that the subject matter of the present disclosure is applicable to other communication systems or services having similar technological backgrounds without departing from the scope of the present disclosure.

In the present disclosure and the drawings, the terms LTE network and evolved universal mobile telecommunications system (UMTS) terrestrial radio access network (E-UTRAN) may be used interchangeably. A CS network may be a UTRAN, a global system for mobile communications (GSM)/enhanced data rates for GSM evolution (EDGE) RAN (GERAN) network, a CDMA2000 network, or a similar network, which is capable of supporting CS service. These networks may be referred to as legacy networks. The legacy networks may further include a time division synchronous CDMA (TD-SCDMA) network. The TD-SCDMA network may generally be classified as a 3G network.

In the present disclosure and the drawings, when it is said that a UE exists in a network, this may cover both a case in which the UE is connected to the network and a case in which the UE is camped on the network in idle state. The term base station (BS) corresponds to evolved node B (eNB), if the network is an E-UTRAN.

In the present disclosure and the drawings, a home subscriber server (HSS) may be an entity that is identical to a home location register (HLR) or physically coexists with the HLR.

In the present disclosure and the drawings, dual transfer mode (DTM) handover (HO) and packet switched (PS) HO may be used interchangeably.

Since an LTE network does not support the CS service, the LTE network may adopt the CSFB scheme using a 2G/3G CS network, when a specific service is required. In the CSFB scheme, an SGs interface is used for exchanging information between a mobility management entity (MME) and a mobile switching center (MSC). Some MSCs of an operator network may have difficulty in using an SGs interface.

In this case, an operator supporting the LTE network and the 2G/3G network at the same time allows a UE to directly monitor control signals of the LTE network and the 2G/3G CS network, rather than the operator supports switching to the CS network for the UE like the CSFB scheme, to support a specific service such as voice service that the LTE network does not directly provide. In other words, the UE transmits/receives control signals to/from the 2G/3G mobile communication system at every predetermined interval to perform a mobility management (MM) procedure of the CS network, while receiving data service through the LTE mobile communication system.

For the convenience of description, a scheme in which a UE receives PS service through a non-legacy mobile communication system and CS service through a legacy mobile communication system will be referred to as a non-legacy PS legacy CS scheme. For example, since the non-legacy mobile communication system is an LTE mobile communication system in various embodiments of the present disclosure, the non-legacy PS legacy CS scheme may also be called an LTE PS legacy CS scheme.

If the LTE PS legacy CS scheme is supported, a UE may operate in the following operation modes.

(1) Operation mode 1: operation mode supporting LTE PS service (including voice over IP multimedia subsystem (IMS) (VoIMS) service).
(2) Operation mode 2: operation mode supporting the LTE PS service (including the VoIMS service) and 2G/3G CS service.
(3) Operation mode 3: operation mode supporting 2G/3G PS service and the 2G/3G CS service.

The VoIMS can be supported only when the LTE mobile communication system has a function of supporting the VoIMS service and is configured to use the function.

Likewise, the CSFB scheme is available only when the LTE mobile communication system and a 2G/3G mobile communication system coexist with the LTE mobile communication system support the CSFB scheme.

A specific operator network may support a plurality of voice service support schemes. The structure of a specific operator network supporting a plurality of voice service support schemes will be described below with reference to FIG. 2.

Figure 2:
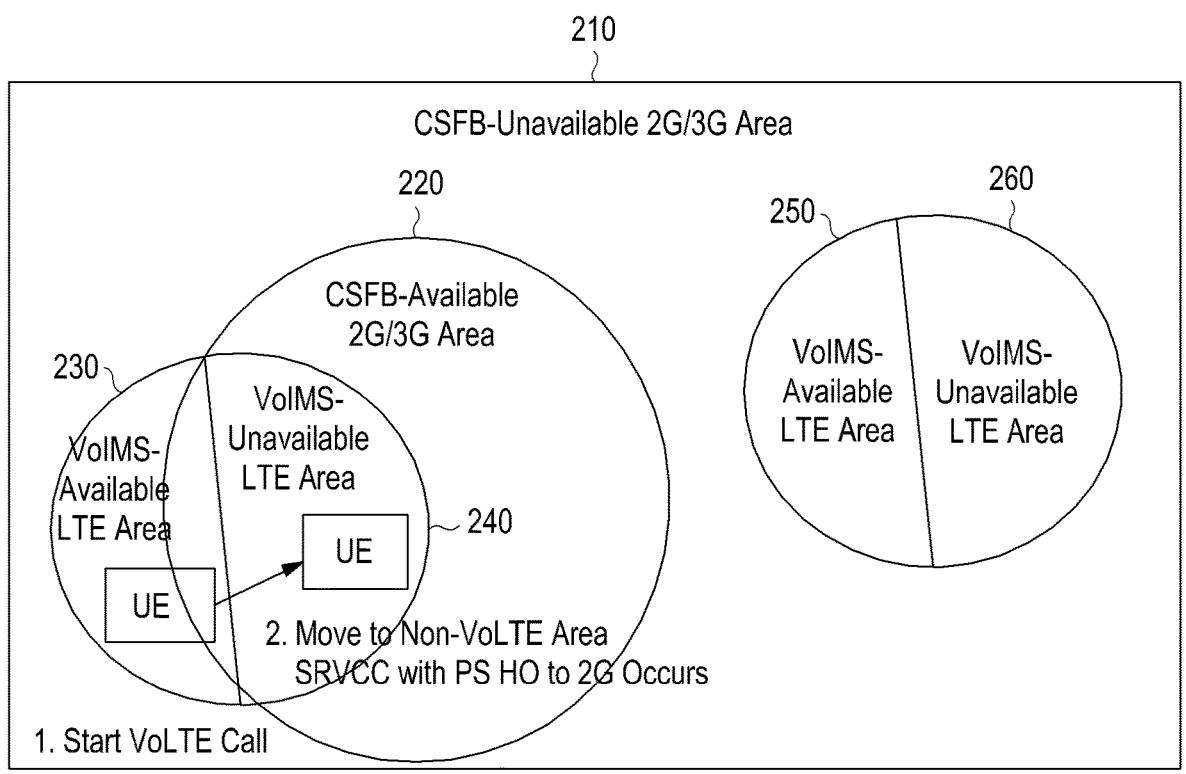
FIG. 2 illustrates an operator network supporting a plurality of voice service support schemes according to an embodiment of the present disclosure.

FIG. 2 illustrates an operator network supporting a plurality of voice service support schemes according to an embodiment of the present disclosure.

Referring to FIG. 2, the operator network includes a plurality of areas, for example, six areas, which are areas #1 210, #2 220, #3 230, #4 240, #5 250, and #6 260.

Area #1 210 is a CSFB-unavailable 2G/3G legacy area. The CSFB-unavailable 2G/3G legacy area is a 2G/3G area in which CSFB is not available.

Area #2 220 is a CSFB-available 2G/3G legacy area. The CSFB-available 2G/3G legacy area is a 2G/3G area in which CSFB is available.

Areas #3 230 and #5 250 are VoLTE-available LTE areas. The VoLTE-available LTE areas are LTE areas in which VoLTE service is available.

Areas #4 240 and #6 260 are VoLTE-unavailable LTE areas. The VoLTE-unavailable LTE areas are LTE areas in which the VoLTE service is not available.

When a UE enters an LTE area, the UE should perform an attach procedure or a tracking area update (TAU) procedure.

However, a UE supporting an LTE PS legacy CS scheme may not have prior knowledge as to whether a current domain providing voice service in the LTE area of an operator network is a PS domain (that is, the VoIMS service is used) or a CS domain. Even though the voice service is provided in the CS domain in the LTE area, the UE using the LTE PS legacy CS scheme may not determine whether it can access a CS network based on the CSFB scheme. For the convenience of description, a UE supporting the LTE PS legacy CS scheme will be referred to as an LTE PS legacy CS UE.

To solve the above problem, when the LTE PS legacy CS UE enters an LTE area and thus starts an attach procedure or a TAU procedure, the LTE PS legacy CS UE performs a combined attach procedure or a combined TAU procedure to check a voice service function supported by the operator network. Then, the LTE PS legacy CS UE may detect a supported function of the operator network by receiving a response message from the operator network. Thus, when needed, the LTE PS legacy CS UE may perform an additional TAU procedure to operate in LTE PS legacy CS mode using the LTE PS legacy CS scheme.

Figure 3:
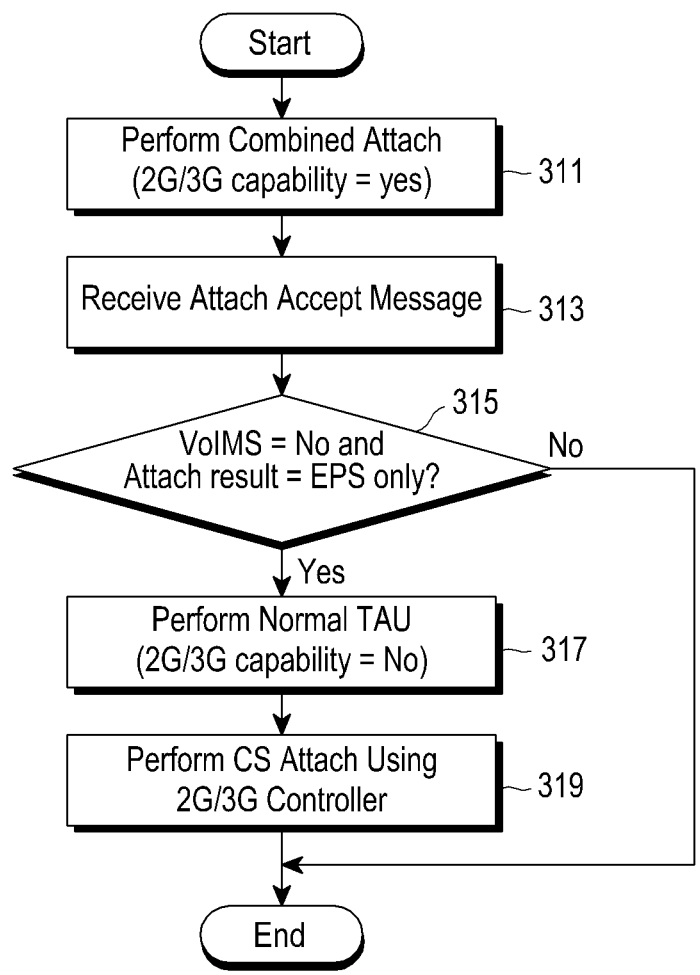
FIG. 3 is a flowchart illustrating an operation for determining a registration procedure type according to whether voice service is supported in a network by an LTE packet switched (PS) legacy circuit switched (CS) user equipment (UE) in a mobile communication system according to an embodiment of the present disclosure.

With reference to FIG. 3, a description will be given of an operation of an LTE PS legacy CS UE for determining a registration procedure type according to whether a network supports voice service in a mobile communication system according to an embodiment of the present disclosure.

FIG. 3 is a flowchart illustrating an operation for determining a registration procedure type according to whether voice service is supported in a network by an LTE PS legacy CS UE in a mobile communication system according to an embodiment of the present disclosure.

Referring to FIG. 3, when the LTE PS legacy CS UE detects its entry into an LTE area, the LTE PS legacy CS UE performs a combined attach procedure in operation 311 and proceeds to operation 313. The combined attach procedure of the LTE PS legacy CS UE will be described below in detail.

For example, the LTE PS legacy CS UE may transmit a message indicating that it supports a 2G/3G scheme and a CSFB/single radio voice call continuity (SRVCC) procedure to an eNB during a radio resource control (RRC) connection establishment procedure or a subsequent procedure for transmitting UE radio capability information. In another example, the LTE PS legacy CS UE may transmit to a mobility management entity (MME) an attach request message including information indicating that it supports the 2G/3G scheme and the CSFB/SRVCC procedure. It is assumed herein that an LTE PS legacy CS UE transmits to an MME an attach request message including information indicating that it supports a 2G/3G scheme and a CSFB/SRVCC procedure. The information indicating support of the 2G/3G scheme and the CSFB/SRVCC procedure may be represented, for example, as '2G/3G capability=yes'.

As the combined attach procedure is performed, the LTE PS legacy CS UE receives an attach accept message from the MME in operation 313 and then proceeds to operation 315. The attach accept message may include various parameters. The LTE PS legacy CS UE may determine a voice service support function supported by the network based on the parameters included in the attach accept message. An operation of the LTE PS legacy CS UE for determining a voice service support function supported by the network will be described below in detail.

The parameters set in the attach accept message may include, for example, EPS network feature support information and an EPS attach result information element (IE). The EPS network feature support information may include an IMS voice over packet switch (VoPS) field which may be configured, for example, in 1 bit. If the IMS VoPS field is set to, for example, '1' in the EPS network feature support information, this implies that the EPS network feature support information indicates support of VoIMS service in the LTE network. On the other hand, if the IMS VoPS field is set to, for example, '0' in the EPS network feature support information, this implies that the EPS network feature support information indicates lack of support of the VoIMS service in the LTE network. If the EPS attach result IE is set to combined EPS/IMSI, this means that the LTE network supports CSFB. On the other hand, if the EPS attach result IE is set to EPS only, this means that the LTE network does not support CSFB.

As described above, the LTE PS legacy CS UE may determine whether the LTE network supports VoIMS or CSFB based on the parameters included in the attach accept message. Accordingly, the LTE PS legacy CS UE may receive voice service using VoIMS or CSFB.

In operation 315, the LTE PS legacy CS UE checks whether the LTE network does not support either of the VoIMS service and the CSFB scheme (VoIMS=No and Attach result=EPS only?) based on the parameters included in the attach accept message. If it is determined that the LTE network does not support either of the VoIMS service and the CSFB scheme, the LTE PS legacy CS UE proceeds to operation 317 to continuously use LTE PS. In this case, if voice centric is set and none of VoIMS and CSFB are supported, a general UE turns off an LTE function (i.e., a function of accessing an E-UTRAN) and may access only a 2G/3G network.

In operation 317, the LTE PS legacy CS UE performs a normal TAU procedure and goes to operation 319. The normal TAU means that a TAU is not a combined-type TAU. The normal TAU procedure will be described below in detail.

If the LTE network supports none of VoIMS and CSFB, the LTE PS legacy CS UE should operate in LTE PS legacy CS mode. For example, if a VoLTE-unavailable LTE area and a CSFB-unavailable 2G/3G area are overlapped as described before with reference to FIG. 2, the LTE network may not support VoIMS and CSFB. In other words, the LTE PS legacy CS UE should perform an operation for receiving the CS service through the 2G/3G network, while receiving the PS service through the LTE network.

However, since the LTE PS legacy CS UE has already notified the eNB of support of the 2G/3G functionality during the combined attach procedure in operation 311, if the LTE network switches the LTE PS legacy CS UE to the 2G/3G network or performs HO of the LTE PS legacy CS UE to the 2G/3G network, the LTE PS legacy CS UE may no longer use the LTE network.

On the other hand, if the LTE PS legacy CS UE operates in the LTE PS legacy CS mode, the LTE PS legacy CS UE does not need to accept a command requesting switch or HO to the 2G/3G network through the LTE network because it can access the 2G/3G network. Therefore, as the LTE network does not support VoIMS and CSFB, if the LTE PS legacy CS UE should operate in the LTE PS legacy CS mode, the LTE PS legacy CS UE performs the normal TAU procedure. In the normal TAU procedure, the LTE PS legacy CS UE sets an EPS update type IE to tracking area (TA) updating (EPS update type IE=TA updating) in a TAU request message. In addition, the LTE PS legacy CS UE should not include information indicating that it has 2G/3G capability or supports CSFB/SRVCC (2G/3G capability=no) in the TAU request message in the normal TAU procedure. Consequently, the LTE PS legacy CS UE may prevent the LTE network from switching or handing over the LTE PS legacy CS UE to the 2G/3G network by performing the normal TAU procedure.

After the normal TAU procedure, the LTE PS legacy CS UE performs a CS registration procedure through its 2G/3G controller in operation 319. The CS registration procedure is performed to receive the CS service through the 2G/3G network. For example, the CS registration procedure includes, for example, an attach procedure or a location area update procedure. The attach procedure through the LTE network and the registration procedure through the 2G/3G network may be performed in a reverse order or in parallel.

While it has been described with reference to FIG. 3 that the LTE PS legacy CS UE performs an initial combined attach procedure in the LTE network, an operation for determining a registration procedure type according to whether the network supports voice service by the LTE PS legacy CS UE may be performed without significant modification even when the LTE PS legacy CS UE performs a combined TAU procedure after an attach procedure in the mobile communication system according to an embodiment of the present disclosure. In this case, in regard to messages transmitted by the LTE PS legacy CS UE, the attach request message may be replaced with a TAU request message and the EPS update type IE may be replaced with combined TA/locating area (LA) updating.

While FIG. 3 illustrates an operation for determining a registration procedure type according to whether a network supports voice service by an LTE PS legacy CS UE in the mobile communication system according to an embodiment of the present disclosure, many modifications can be made to FIG. 3. For example, although the operations are sequential in FIG. 3, the operations may be overlapped, parallel, or performed in a changed order. Or the operations may be performed a plurality of times.

Even though a UE is an LTE PS legacy CS UE supporting the LTE PS legacy CS scheme, if the UE is configured to support SRVCC in a VoIMS-available LTE area, the LTE PS legacy CS UE may be capable of notifying the LTE network that it has 2G/3G capability and supports SRVCC. If the LTE PS legacy CS UE does not notify the LTE network that it has 2G/3G capability, when the LTE PS legacy CS UE moves out of the VoIMS-available LTE area while receiving the VoIMS service, SRVCC is not supported for the LTE PS legacy CS UE, thereby disconnecting a call.

In this context, an operation for determining whether to notify a network of 2G/3G capability according to whether SRVCC is needed by an LTE PS legacy CS UE in a mobile communication system according to an embodiment of the present disclosure will be described below with reference to FIG. 4.

Figure 4:
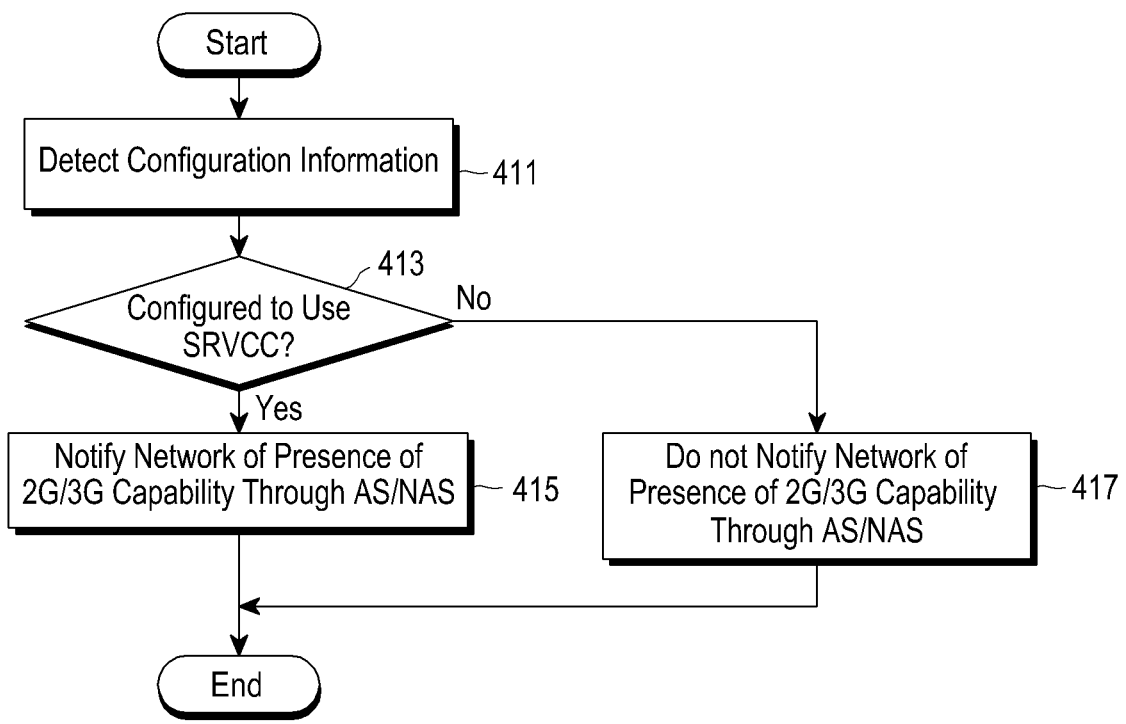
FIG. 4 is a flowchart illustrating an operation for determining whether to notify a network of $2^{nd}$ generation (2G)/$3^{rd}$ generation (3G) capability when single radio voice call continuity (SRVCC) is needed by an LTE PS legacy CS UE in a mobile communication system according to an embodiment of the present disclosure.

FIG. 4 is a diagram illustrating an operation for determining whether to notify a network of 2G/3G capability when SRVCC is needed by an LTE PS legacy CS UE in a mobile communication system according to an embodiment of the present disclosure.

Referring to FIG. 4, the LTE PS legacy CS UE detects its configuration information in operation 411 and checks whether it has been configured to use SRVCC in operation 413. If the LTE PS legacy CS UE has been configured to use SRVCC, the LTE PS legacy CS UE proceeds to operation 415.

In operation 415, the LTE PS legacy CS UE notifies the network that the LTE PS legacy CS UE has 2G/3G capability by transmitting its capability information to an access server (AS) or a network AS (NAS). The reason for notifying the network that the LTE PS legacy CS UE has the 2G/3G capability by transmitting the capability information is to activate SRVCC HO of the LTE PS legacy CS UE to a 2G/3G network. The capability information about the LTE PS legacy CS UE may be transmitted, for example, in a message.

If the LTE PS legacy CS UE has not been configured to use SRVCC in operation 413, the LTE PS legacy CS UE does not notify the network that it has the 2G/3G capability through the AS or NAS in operation 417. In other words, the LTE PS legacy CS UE does not transmit its capability information to the network. The reason for not transmitting the capability information to the network is to prevent SRVCC HO of the LTE PS legacy CS UE to the 2G/3G network.

While FIG. 4 illustrates an operation for determining whether to notify a network of 2G/3G capability according to whether SRVCC is needed by an LTE PS legacy CS UE in a mobile communication system according to an embodiment of the present disclosure, many modifications can be made to FIG. 4. For example, although the operations are sequential in FIG. 4, the operations may be overlapped, parallel, or performed in a changed order. Or the operations may be performed a plurality of times.

When the LTE PS legacy CS UE moves from a VoLTE-available area to a VoLTE-unavailable area while receiving VoLTE service, the network may use SRVCC to prevent voice call disconnection. If the LTE PS legacy CS UE is capable of transmitting/receiving PS service data, the LTE network may perform PS HO along with SRVCC. If the LTE PS legacy CS UE performs PS HO to the 2G/3G network, the PS data service quality of the 2G/3G network may be lower than that of the LTE network. Since the LTE PS legacy CS UE supports the LTE PS legacy CS scheme, the LTE PS legacy CS UE may transmit/receive PS service data in the LTE network in spite of the SRVCC HO of a voice call to the CS network.

Therefore, when an SRVCC is performed, a user of the LTE PS legacy CS UE may experience a much higher PS service quality if an action is taken to transmit/receive PS service data again to/from the LTE network after the PS HO.

In other words, upon receipt of a PS HO command along with an SRVCC execution command, the LTE PS legacy CS UE switches its operation mode to LTE PS legacy CS mode after a PS HO procedure and performs a TAU procedure again through an LTE controller of the LTE PS legacy CS UE. The TAU procedure may be the afore-described normal TAU procedure. Upon receipt of a TAU request message from the LTE PS legacy CS UE, a core network (CN) enables the LTE PS legacy CS UE to transmit/receive PS service data through the LTE network by setting a path for PS service data to the LTE network.

Figure 5:
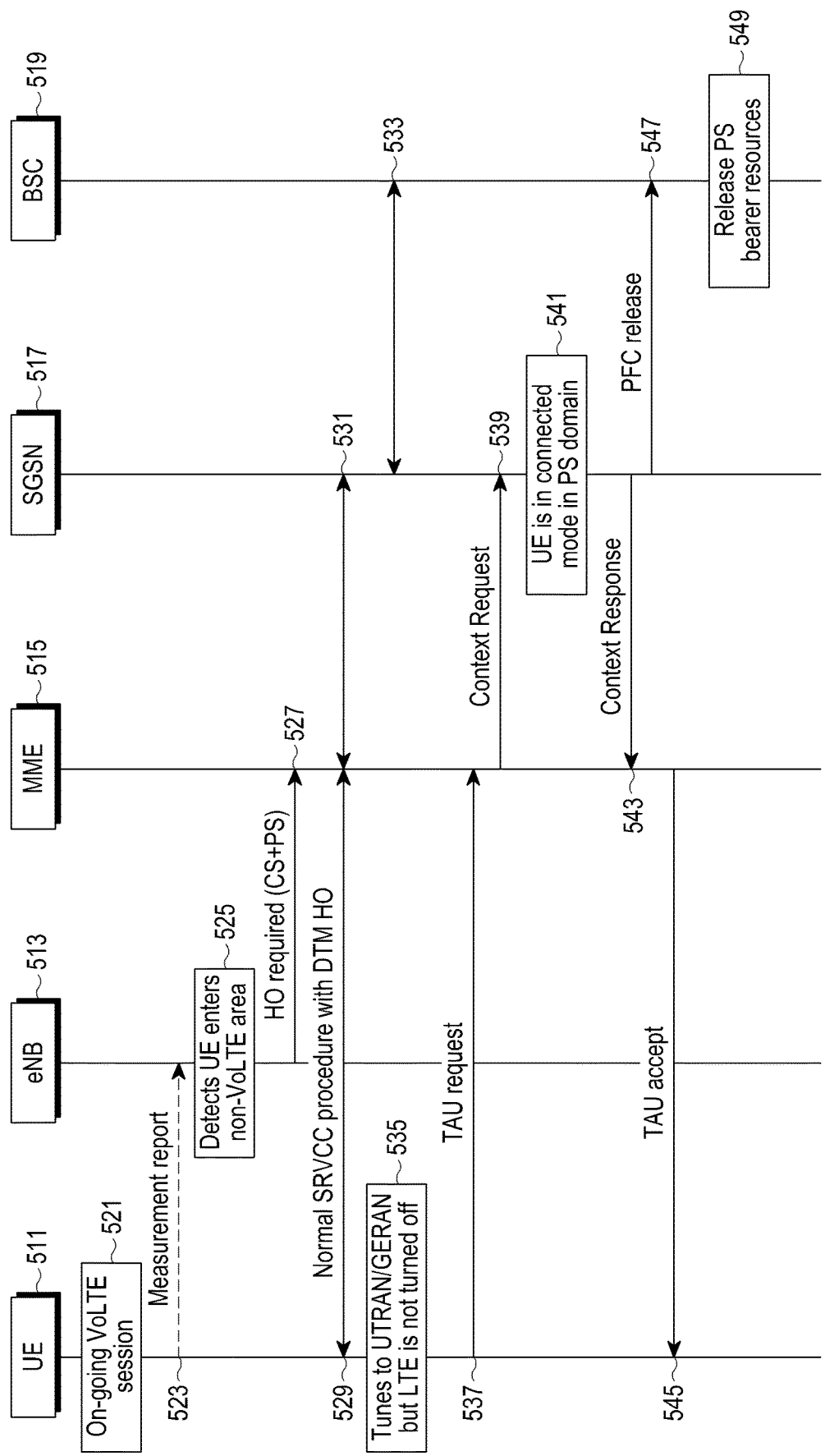
FIG. 5 is a diagram illustrating a signal flow for an operation for performing a tracking area update (TAU) procedure after an SRVCC procedure and a dual transfer mode (DTM) handover (HO) procedure by an LTE PS legacy CS UE in a mobile communication system according to an embodiment of the present disclosure.

With reference to FIG. 5, an operation for performing a TAU procedure again after an SRVCC procedure and a DTM HO procedure by an LTE PS legacy CS UE in a mobile communication system according to an embodiment of the present disclosure will be described below.

FIG. 5 is a diagram illustrating a signal flow for an operation for performing a TAU procedure after an SRVCC procedure and a DTM HO procedure by an LTE PS legacy CS UE in a mobile communication system according to an embodiment of the present disclosure.

Referring to FIG. 5, the mobile communication system includes a UE 511, an eNB 513, an MME 515, a serving general packet radio service (GPRS) support node (SGSN) 517, and a base station controller (BSC) 519. It is assumed that the UE 511 is an LTE PS legacy CS UE and the terms UE and LTE PS legacy CS UE are interchangeably used in FIG. 5.

During a current VoLTE session in operation 521, in operation 523, the LTE PS legacy CS UE 511 transmits a measurement report message to the eNB 513 in every predetermined period or upon generation of an event. Meanwhile, if the physical location of the LTE PS legacy CS UE 511 is changed or moves to a VoLTE-unavailable LTE area due to a change in a received signal strength, the eNB 513 detects that the LTE PS legacy CS UE 511 has entered the VoLTE-unavailable LTE area in operation 525. For the convenience of description, the VoLTE-unavailable LTE area will be referred to as a non-VoLTE area. Upon detection that the LTE PS legacy CS UE 511 has entered the non-VoLTE area, the eNB 513 may determine that it should start an SRVCC procedure for the LTE PS legacy CS UE 511.

When determining to start the SRVCC procedure, the eNB 513 may notify the MME 515 that a PS HO (or DTM HO) procedure is required along with the SRVCC procedure by transmitting an HO required message (HO required (CS+PS)) in operation 527. That is, the eNB 513 may indicate to the MME 515 that the SRVCC procedure and the PS HO procedure are required for the LTE PS legacy CS UE 511 by transmitting the HO required message to the MME 515. A voice call of the LTE PS legacy CS UE 511 may be handed over to a CS domain by the SRVCC procedure and an EPS bearer (referred to as a bearer) being used in the LTE network may be handed over to a PS domain of the 2G/3G network, based on operation 527.

Upon receipt of the HO required message from the eNB 513, the MME 515 performs a normal SRVCC procedure with DTM HO with the LTE PS legacy CS UE 511 in operation 529. That is, upon receipt of a DTM HO command along with an SRVCC command from the MME 515, the LTE PS legacy CS UE 511 performs an SRVCC procedure with DTM HO. While it has been described by way of example that the MME 515 performs the DTM HO procedure with the LTE PS legacy CS UE 511, the MME 515 may perform a PS HO procedure with the LTE PS legacy CS UE 511 in another example. Further, the MME 515 performs the normal SRVCC procedure with DTM HO (or PS HO) with the SGSN 517 in operation 531 and the SGSN 517 performs a normal SRVCC procedure with DTM HO (or PS HO) with the BSC 519 in operation 533.

As described before, if the EPS bearer is handed over to the 2G/3G network, the LTE PS legacy CS UE 511 should use a 2G/3G PS network. That is, the LTE PS legacy CS UE 511 should use the 2G/3G network, although it can transmit/receive PS service data through the LTE network simultaneously with continuous reception of voice service through a CS network.

Accordingly, upon completion of the SRVCC procedure with DTM HO (or PS HO), the LTE PS legacy CS UE 511 may operate in the LTE PS legacy CS mode to increase a user-experienced service quality. In other words, the LTE PS legacy CS UE 511 performs a TAU procedure with the LTE network through an LTE transmitter/receiver and an LTE controller of the LTE PS legacy CS UE 511, while receiving the CS service through a 2G/3G transmitter/receiver and a 2G/3G controller of the LTE PS legacy CS UE 511 in operation 535. That is, the LTE PS legacy CS UE 511 switches to a UTRAN/GERAN but does not turn off LTE-related modules such as the LTE transmitter/receiver and the LTE controller.

Thus, the LTE PS legacy CS UE 511 transmits a TAU request message to the MME 515 in operation 537. The TAU procedure may be the normal TAU procedure. Upon receipt of the TAU request message from the LTE PS legacy CS UE 511, the MME 515 may detect the SGSN 517 to which the LTE PS legacy CS UE 511 has been connected in the 2G/3G network by PS HO, based on an identifier (ID) included in the received TAU request message. The MME 515 transmits a context request message to the detected SGSN 517 in operation 539.

If the LTE PS legacy CS UE 511 transmits the TAU request message to the LTE network within a relatively short time or a predetermined time after the PS HO to the 2G/3G network, the SGSN 517 may receive the context request message from the MME 511 even though the SGSN 517 determines that the LTE PS legacy CS UE 511 is still connected to the 2G/3G PS network. Nonetheless, the SGSN 517 transmits a context response message to the MME 515 in response to the context request message without rejecting the context request message or processing the context request message as an error in operation 543. Upon receipt of the context response message from the MME 515, the SGSN 517 determines that the LTE PS legacy CS UE 511 is in the connected mode in the PS domain in operation 541.

Upon receipt of the context response message from the SGSN 517, the MME 515 activates the EPS bearer again to the LTE network and switches a data path to the LTE network by a TAU procedure so that the LTE PS legacy CS UE 511 may transmit/receive PS service data to/from the LTE network. That is, after receiving the context response message from the SGSN 517, the MME 515 transmits a TAU accept message to the LTE PS legacy CS UE 511 in operation 545 and, thus, the LTE PS legacy CS UE 511 may transmit/receive PS service data through the LTE network.

Having transmitted the context response message to the MME 515, that is, having determined that the LTE PS legacy CS UE 511 has not transmitted/received PS service data in the 2G/3G network, the SGSN 517 transmits a packet flow context (PFC) release message commanding release of all PS contexts, that is, all PFCs to the BSC 519 in operation 547. Upon receipt of the PFC release message from the SGSN 517, the BSC 519 releases the PS contexts, that is, the PFCs in operation 549. That is, the BSC 519 releases PS bearer resources.

While FIG. 5 illustrates an operation for performing a TAU procedure again after an SRVCC procedure with DTM HO by an LTE PS legacy CS UE in a mobile communication system according to an embodiment of the present disclosure, many modifications can be made to FIG. 5. For example, although the operations are sequential in FIG. 5, the operations may be overlapped, parallel, or performed in a changed order. Or the operations may be performed a plurality of times.

In the embodiment of the present disclosure illustrated in FIG. 5, even though an SGSN determines that an LTE PS legacy CS UE is connected to a PS domain in a 2G/3G network, the SGSN accepts a context request message received from an MME so that PS service may be provided through an LTE network. If the SGSN rejects the context request message in this situation, the MME may not complete a TAU procedure. In this case, the MME may transmit information indicating retry of an attach procedure, while indicating failure of the TAU procedure to the LTE PS legacy CS UE. By this operation, the LTE PS legacy CS UE may perform the attach procedure again without unnecessary TAU or public land mobile network (PLMN) reselection. Consequently, time to resume PS service data transmission/reception can be reduced.

Now, a description will be given of an operation for a TAU procedure again after an SRVCC procedure with DTM HO by an LTE PS legacy CS UE in a mobile communication system according to an embodiment of the present disclosure with reference to FIG. 6.

Figure 6:
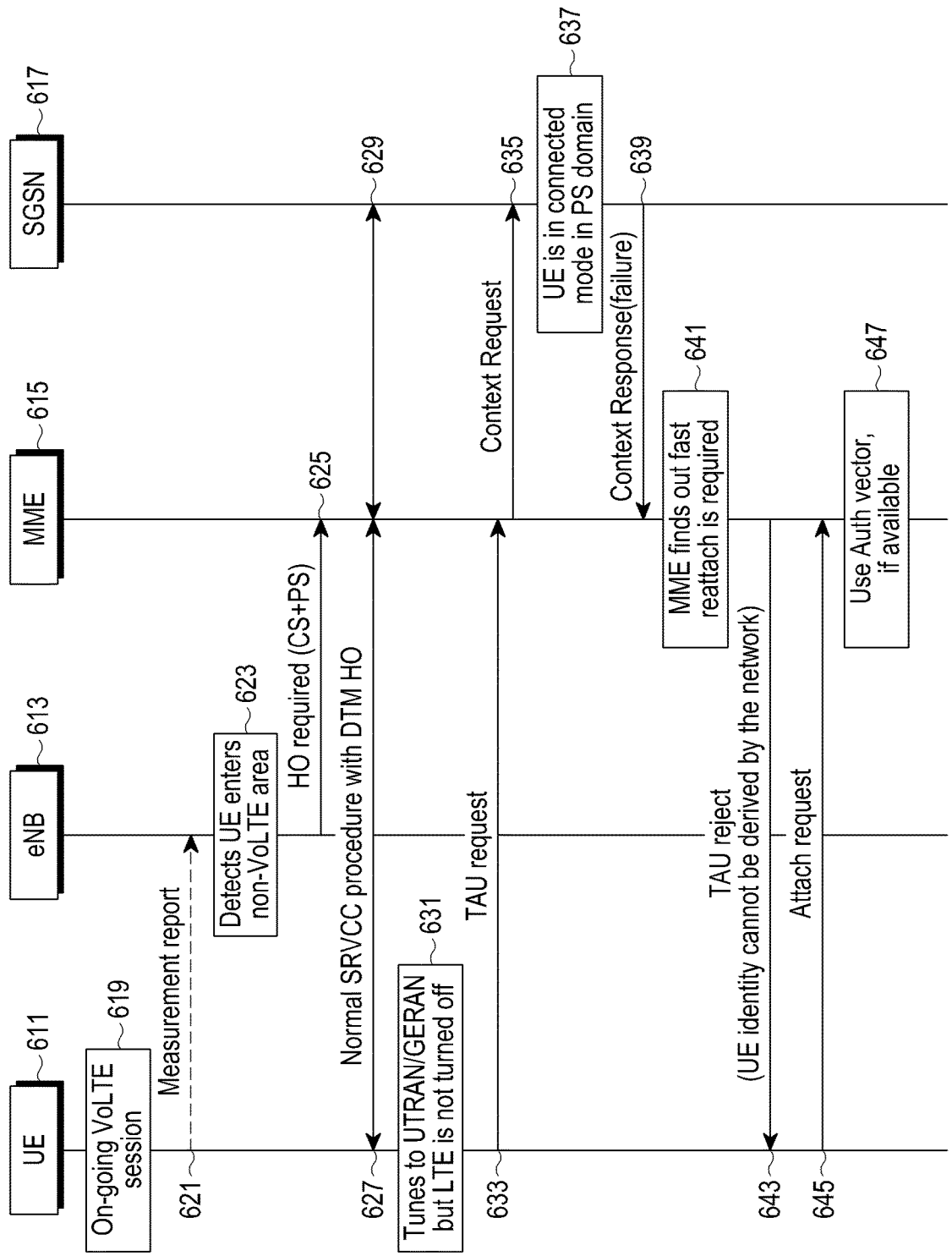
FIG. 6 is a diagram illustrating a signal flow for an operation for performing a TAU procedure after an SRVCC procedure and a DTM HO procedure by an LTE PS legacy CS UE in a mobile communication system according to an embodiment of the present disclosure.

FIG. 6 is a diagram illustrating a signal flow for an operation for a TAU procedure again an SRVCC procedure with DTM HO by an LTE PS legacy CS UE in a mobile communication system according to an embodiment of the present disclosure.

Referring to FIG. 6, the mobile communication system includes a UE 611, an eNB 613, an MME 615, and an SGSN 617. It is assumed that the UE 511 is an LTE PS legacy CS UE and the terms UE and LTE PS legacy CS UE are used interchangeably in FIG. 6.

During an on-going VoLTE session established in operation 619, the LTE PS legacy CS UE 611 transmits a measurement report message to the eNB 613 in every predetermined period or upon generation of an event in operation 621. Meanwhile, if the physical location of the LTE PS legacy CS UE 511 is changed or moves to a non-VoLTE area due to a change in a received signal strength, the eNB 613 detects that the LTE PS legacy CS UE 611 has entered the non-VoLTE area in operation 623. Upon detection that the LTE PS legacy CS UE 611 has entered the non-VoLTE area, the eNB 613 may determine that it should start an SRVCC procedure for the LTE PS legacy CS UE 611.

When determining to start the SRVCC procedure, the eNB 613 may notify the MME 615 that a PS HO (or DTM HO) procedure is required along with the SRVCC procedure by transmitting an HO required message (HO required (CS+PS)) in operation 625. That is, the eNB 613 may indicate to the MME 615 that the SRVCC procedure and a PS HO procedure are required for the LTE PS legacy CS UE 611 by transmitting the HO required message to the MME 615. A voice call of the LTE PS legacy CS UE 611 may be handed over to a CS domain by the SRVCC procedure and an EPS bearer being used in the LTE network may be handed over to a PS domain of the 2G/3G network, based on operation 625.

Upon receipt of the HO required message from the eNB 613, the MME 615 performs a normal SRVCC procedure with DTM HO with the LTE PS legacy CS UE 611 in operation 627. That is, upon receipt of a DTM HO command along with an SRVCC command from the MME 615, the LTE PS legacy CS UE 611 performs the SRVCC procedure with DTM HO. While it has been described by way of example that the MME 615 performs the DTM HO procedure with the LTE PS legacy CS UE 611, the MME 615 may perform the PS HO procedure with the LTE PS legacy CS UE 611 in another example. Further, the MME 615 performs the normal SRVCC procedure with DTM HO (or PS HO) with the SGSN 617 in operation 629.

As described above, if the EPS bearer is handed over to the 2G/3G network, the LTE PS legacy CS UE 611 should use the 2G/3G PS network. That is, the LTE PS legacy CS UE 611 should use the 2G/3G network, although it can transmit/receive PS service data through the LTE network simultaneously with continuous reception of voice service through a CS network.

Accordingly, upon completion of the SRVCC procedure with DTM HO (or PS HO), the LTE PS legacy CS UE 611 may operate in LTE PS legacy CS mode to increase a user-experienced service quality. In other words, the LTE PS legacy CS UE 611 performs a TAU procedure with the LTE network through its LTE transmitter/receiver and LTE controller, while receiving the CS service through its 2G/3G transmitter/receiver and 2G/3G controller in operation 631. That is, the LTE PS legacy CS UE 611 switches to a UTRAN/GERAN but does not turn off LTE-related modules such as the LTE transmitter/receiver and the LTE controller.

Thus, the LTE PS legacy CS UE 611 transmits a TAU request message to the MME 615 in operation 633. Upon receipt of the TAU request message from the LTE PS legacy CS UE 611, the MME 615 may detect the SGSN 617 to which the LTE PS legacy CS UE 611 has been connected in the 2G/3G network by the PS HO, based on an ID included in the received TAU request message. The MME 615 transmits a context request message to the detected SGSN 617 in operation 635.

If the LTE PS legacy CS UE 611 transmits the TAU request message to the LTE network within a relatively short time or a predetermined time after the PS HO to the 2G/3G network, the SGSN 617 may receive the context request message from the MME 511 even though the SGSN 617 determines that the LTE PS legacy CS UE 611 is still connected to the 2G/3G PS network.

In this case, if the SGSN 617 determines that the LTE PS legacy CS UE 611 is connected to the 2G/3G network, the SGSN 617 may respond to the context request message, determining that an error has occurred. Then, the SGSN 617 transmits a context response message indicating rejection to respond to the context request message from the MME 615 in operation 639. The context response message includes a cause for the failure of responding to the context request message. The cause may explicitly indicate that the UE is in connected state to the 2G/3G PS network or may simply indicate rejection of the request of the MME 615.

Upon receipt of the context response message from the SGSN 617, the MME 615 determines that the LTE PS legacy CS UE 611 needs fast reattachment to prevent time retry of an unnecessary TAU procedure or selection of another radio access technology (RAT) or PLMN by the LTE PS legacy UE 611 in operation 641.

Determining that fast reattachment of the LTE PS legacy CS UE 611 is required, the MME 615 transmits a TAU reject message to the LTE PS legacy CS UE 611 so that the LTE PS legacy CS UE 511 may perform a reattach procedure in operation 643. Cause information set in the TAU reject message indicates that the reattach procedure is required. That is, the cause information included in the TAU reject message may be set to 'UE identity cannot be derived by the network'. The 'UE identity cannot be derived by the network' means that the network cannot identify the UE.

Upon receipt of the TAU reject message including the cause information set to 'UE identity cannot be derived by the network' from the MME 615, the LTE PS legacy CS UE 611 determines that it has failed in the TAU procedure and needs to retry the attach procedure. Therefore, the LTE PS legacy CS UE 611 performs the attach procedure again by transmitting an attach request message to the MME 615 in operation 645.

Upon receipt of the attach request message from the LTE PS legacy CS UE 611, the MME 615 may perform the attach procedure fast by omitting interaction with an HSS (not shown in FIG. 6), using an unused authentication vector stored for the LTE PS legacy CS UE 611 if available in operation 647.

While FIG. 6 illustrates an operation for performing a TAU procedure after an SRVCC procedure with DTM HO by an LTE PS legacy CS UE in a mobile communication system according to an embodiment of the present disclosure, many modifications can be made to FIG. 6. For example, although the operations are sequential in FIG. 6, the operations may be overlapped, parallel, or performed in a changed order. Or the operations may be performed a plurality of times.

In an embodiment of the present disclosure, if an eNB determines that an SRVCC procedure is needed because an LTE PS legacy CS UE has not yet moved out of an LTE area but just moved to a non-VoLTE area, the eNB does not perform a PS HO procedure. If the PS HO procedure is not performed when the SRVCC procedure starts, an MME suspends PS bearers. If the LTE PS legacy CS UE switches to a 2G/3G network and, thus, does not perform a routing area update (RAU) procedure, a PS bearer context of the LTE PS legacy CS UE is transmitted to an SGSN or is not deleted in the MME. When the LTE PS legacy CS UE performs a TAU procedure with the LTE network in this state, the MME may activate an EPS bearer again to the LTE network without interacting with the SGSN. The TAU procedure may be the afore-described normal TAU procedure.

Figure 7:
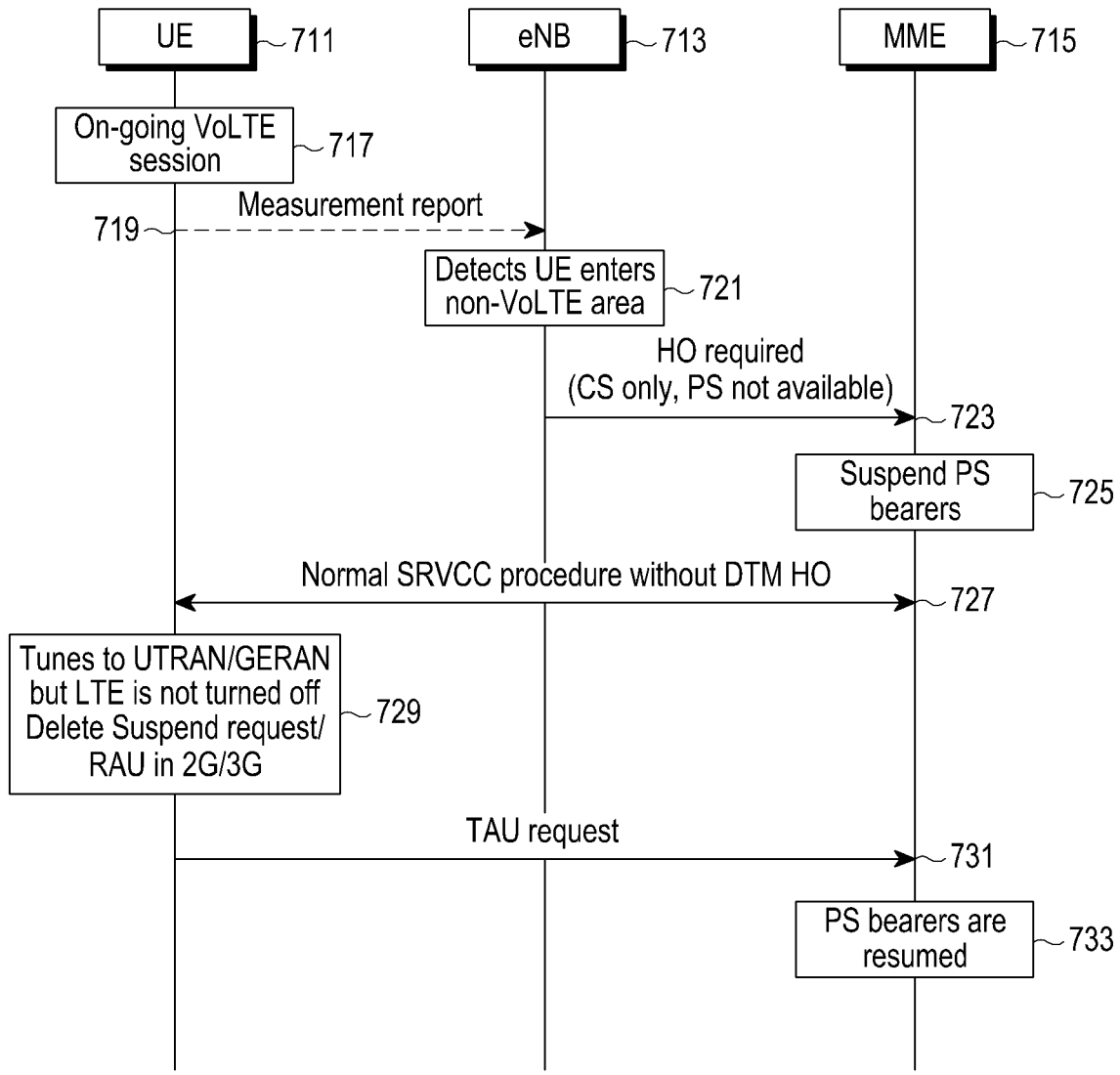
FIG. 7 is a diagram illustrating a signal flow for an operation for performing a TAU procedure after an SRVCC procedure without a DTM HO procedure by an LTE PS legacy CS UE in a mobile communication system according to an embodiment of the present disclosure.

With reference to FIG. 7, an operation for performing a TAU procedure again after an SRVCC procedure without DTM HO by an LTE PS legacy CS UE in a mobile communication system according to an embodiment of the present disclosure will be described below.

FIG. 7 is a diagram illustrating a signal flow for an operation for performing a TAU procedure after an SRVCC procedure without DTM HO by an LTE PS legacy CS UE in a mobile communication system according to an embodiment of the present disclosure.

Referring to FIG. 7, the mobile communication system includes a UE 711, an eNB 713, and an MME 715. It is assumed that the UE 711 is an LTE PS legacy CS UE and the terms UE and LTE PS legacy CS UE are used interchangeably in FIG. 7. During an on-going VoLTE session established in operation 717, the LTE PS legacy CS UE 711 transmits a measurement report message to the eNB 713 in every predetermined period or upon generation of an event in operation 719. Meanwhile, if the physical location of the LTE PS legacy CS UE 711 is changed or moves to a non-VoLTE area due to a change in a received signal strength, the eNB 713 detects that the LTE PS legacy CS UE 711 has entered the non-VoLTE area in operation 721.

Upon detection that the LTE PS legacy CS UE 711 has entered the non-VoLTE area, the eNB 713 may determine to start an SRVCC procedure for the LTE PS legacy CS UE 711. When determining to start the SRVCC procedure, the eNB 713 determines whether there is a non-VoLTE area proximate to the LTE PS legacy CS UE 711. In the presence of a non-VoLTE area proximate to the LTE PS legacy CS UE 711, the eNB 713 performs only an SRVCC procedure without PS HO (or DTM HO) even though a 2G/3G cell to which the LTE PS legacy CS UE 711 will switch by the SRVCC procedure. In other words, the eNB 713 transmits an HO required message including an indication indicating that a CS-only HO procedure needs to be performed and PS service is not available to the LTE PS legacy CS UE 711 in a target cell (HO required (CS only, PS not available)) in operation 723.

Upon receipt of the HO required message from the eNB 713, the MME 715 performs an SRVCC procedure, while suspending PS bearers in operation 725. Subsequently, a normal SRVCC procedure without DTM HO is performed among the LTS PS legacy CS UE 711, the eNB 713, and the MME 715 in operation 727. Consequently, the LTE PS legacy CS UE 711 may not transmit a suspend request message and a RAU request message which are supposed to be transmitted in the 2G/3G network.

After the SRVCC procedure, the LTE PS legacy CS UE 711 may switch its operation mode to LTE PS legacy CS mode and perform a TAU procedure using its LTE controller and LTE transmitter/receiver in operation 729. Thus, the LTE PS legacy CS UE 711 transmits a TAU request message to the MME 715 in operation 731. The TAU procedure may be the afore-described normal TAU procedure.

Upon receipt of the TAU request message from the LTE PS legacy CS UE 711, the MME 715 reactivates the suspended EPS bearers in operation 733.

While FIG. 7 illustrates an operation for performing a TAU procedure again after only an SRVCC procedure without DTM HO by an LTE PS legacy CS UE in a mobile communication system according to an embodiment of the present disclosure, many modifications can be made to FIG. 7. For example, although the operations are sequential in FIG. 7, the operations may be overlapped, parallel, or performed in a changed order. Or the operations may be performed a plurality of times.

In the embodiment of the present disclosure illustrated in FIG. 7, after an SRVCC procedure without DTM HO, an LTE PS legacy CS UE performs a TAU procedure again. Now, an operation for performing a TAU procedure again after only an SRVCC procedure without DTM HO by an LTE PS legacy CS UE in a mobile communication system according to an embodiment of the present disclosure will be described below with reference to FIG. 8.

Figure 8:
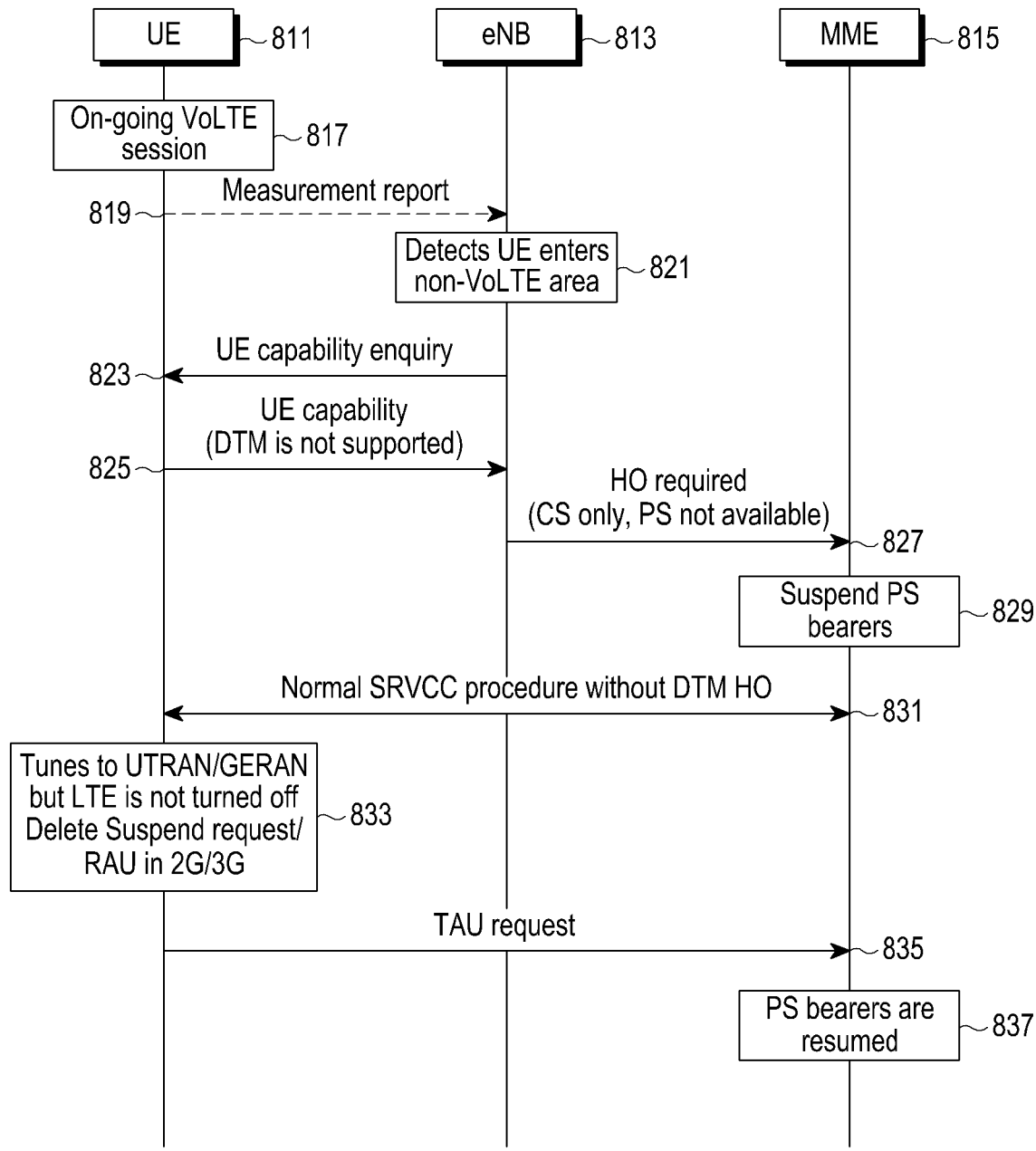
FIG. 8 is a diagram illustrating a signal flow for an operation for performing a TAU procedure after an SRVCC procedure without a DTM HO procedure by an LTE PS legacy CS UE in a mobile communication system according to an embodiment of the present disclosure.

FIG. 8 is a diagram illustrating a signal flow for an operation for performing a TAU procedure after an SRVCC procedure without DTM HO by an LTE PS legacy CS UE in a mobile communication system according to an embodiment of the present disclosure.

Referring to FIG. 8, the mobile communication system includes a UE 811, an eNB 813, and an MME 815. It is assumed that the UE 811 is an LTE PS legacy CS UE and the terms UE and LTE PS legacy CS UE are used interchangeably in FIG. 8.

During an on-going VoLTE session established in operation 817, the LTE PS legacy CS UE 811 transmits a measurement report message to the eNB 813 in every predetermined period or upon generation of an event in operation 819. Meanwhile, if the physical location of the LTE PS legacy CS UE 811 is changed or moves to a non-VoLTE area due to a change in a received signal strength, the eNB 813 detects that the LTE PS legacy CS UE 811 has entered the non-VoLTE area in operation 821.

Upon detection that the LTE PS legacy CS UE 811 has entered the non-VoLTE area, the eNB 813 may determine that it should start an SRVCC procedure for the LTE PS legacy CS UE 811. Then, the eNB 813 determines whether there is a non-VoLTE area proximate to the LTE PS legacy CS UE 811. In the event that there is a non-VoLTE area proximate to the LTE PS legacy CS UE 811, the eNB 813 transmits a UE radio capability enquiry message to the LTE PS legacy CS UE 811 in operation 823. That is, the eNB 813 requests the LTE PS legacy CS UE 811 to transmit information about the radio capability of the LTE PS legacy CS UE 811 by transmitting the UE radio capability enquiry message in operation 823.

In response to the UE radio capability enquiry message from the eNB 813, the LTE PS legacy CS UE 811 transmits a UE capability information message to the eNB 813 in operation 825. The UE capability information message includes information indicating that the LTE PS legacy CS UE 811 does not support DTM HO or PS HO to a UTRAN/GERAN (UE capability (DTM is not supported)).

In response to the UE capability information message from the LTE PS legacy CS UE 811, the eNB 813 performs only an SRVCC procedure without PS HO (or DTM HO) even though a 2G/3G cell to which the LTE PS legacy CS UE 811 will switch by the SRVCC procedure supports PS HO or DTM HO. In other words, the eNB 813 transmits an HO required message including an indication indicating that a CS-only HO procedure needs to be performed and PS service is not available to the LTE PS legacy CS UE 811 in a target cell (HO required (CS only, PS not available)) in operation 827.

Upon receipt of the HO required message from the eNB 813, the MME 815 performs an SRVCC procedure, while suspending PS bearers in operation 829. Subsequently, an SRVCC procedure is performed among the LTS PS legacy CS UE 811, the eNB 813, and the MME 815 in operation 831. Consequently, the LTE PS legacy CS UE 811 may not transmit a suspend request message and an RAU request message, which are supposed to be transmitted in the 2G/3G network.

After the SRVCC procedure, the LTE PS legacy CS UE 811 may switch its operation mode to LTE PS legacy CS mode and perform a TAU procedure using its LTE controller and LTE transmitter/receiver in operation 833. Thus, the LTE PS legacy CS UE 811 transmits a TAU request message to the MME 815 in operation 835.

Upon receipt of the TAU request message from the LTE PS legacy CS UE 811, the MME 815 reactivates the suspended EPS bearers in operation 837

While FIG. 8 illustrates an operation for performing a TAU procedure again after only an SRVCC procedure without DTM HO by an LTE PS legacy CS UE in a mobile communication system according to an embodiment of the present disclosure, many modifications can be made to FIG. 8. For example, although the operations are sequential in FIG. 8, the operations may be overlapped, parallel, or performed in a changed order. Or the operations may be performed a plurality of times.

In the mobile communication system according to the embodiment of the present disclosure illustrated in FIG. 8, as a modification to the operation for performing a TAU procedure again after only an SRVCC procedure without DTM HO by an LTE PS legacy CS UE, if the LTE PS legacy CS UE with an active VoLTE session established determines that it approaches an LTE TA not included in a TA identifier (TAI) list stored in the LTE PS legacy CS UE by a measurement report message, the LTE PS legacy CS UE may perform a TAU procedure by changing information indicating whether DTM HO or PS HO is performed among information about UE radio capability to non-support of DTM HO or PS HO. Upon receipt of the modified information about UE capability by the TAU procedure, an LTE network may not perform an SRVCC procedure and a DTM HO or PS HO procedure simultaneously based on the received information about UE radio capability, when the SRVCC procedure occurs.

As described above, if an operator network does not support either of VoIMS and CSFB, a UE may operate in LTE PS legacy CS mode.

On the other hand, if a legacy network coexisting with an LTE network is a 2G network, data service is not available to the UE. Even if the data service is available, it is preferred to transmit PS data through the LTE network instead of the 2G network having a relatively low service quality. However, if the legacy network coexisting with the LTE network is a 3G network, both data service and CS service are available to the UE through the 3G network. The UE may determine whether the network supports VoIMS or CSFB by a combined attach procedure or a combined TAU procedure. If the network does not support either of VoIMS and CSFB and neighbor information provided by the LTE network in which the UE is currently performing an attach procedure or a TAU procedure indicates the presence of only a 2G legacy network proximate to the UE or the UE is aware that only a 2G legacy network is available, the UE should operate in the LTE PS legacy CS mode, as described above. If the UE is aware that a 3G legacy network is available proximate to the UE, the UE may transmit PS data through the 3G legacy network.

Figure 9:
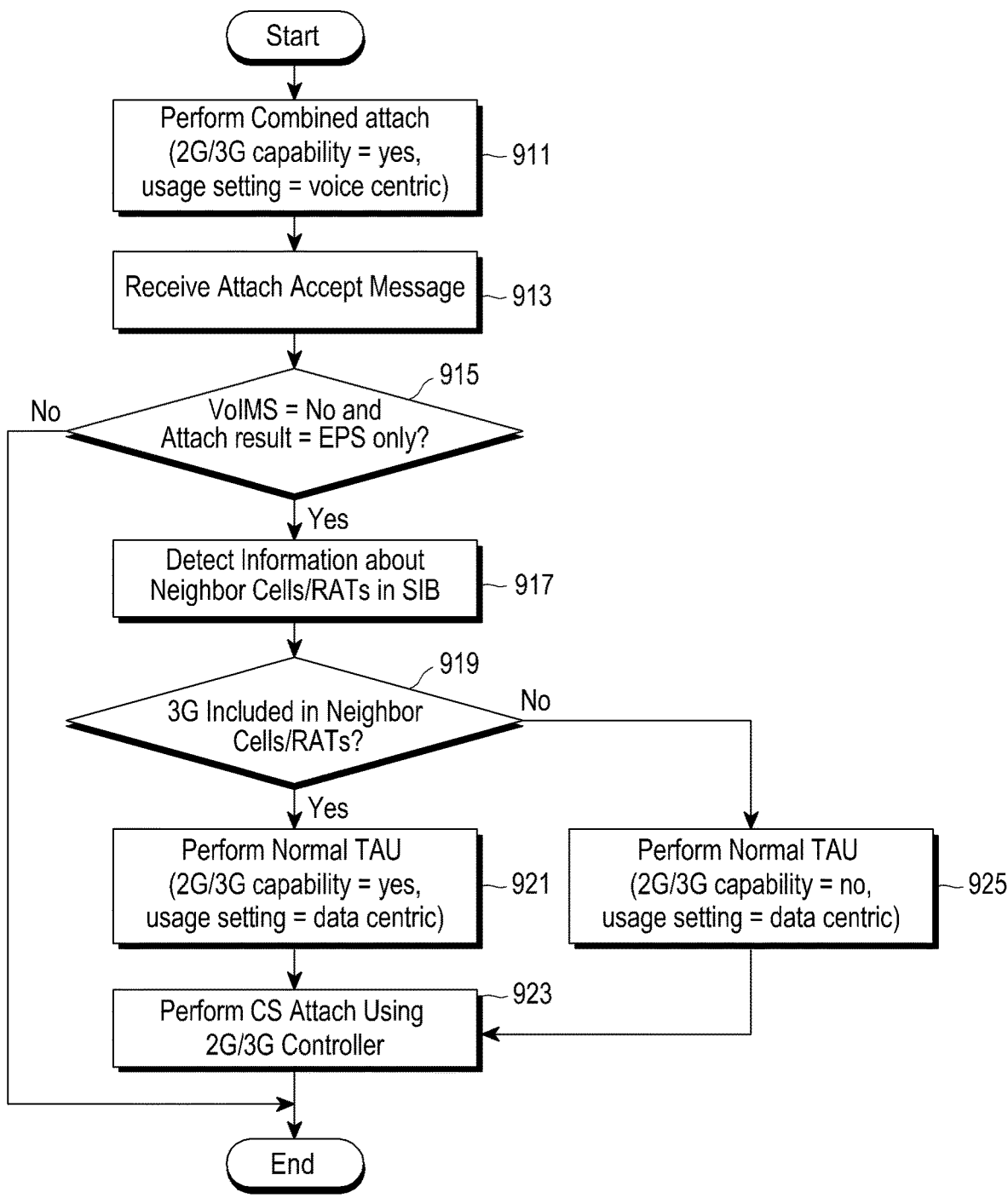
FIG. 9 is a flowchart illustrating an operation of an LTE PS legacy CS UE based on the type of a legacy network coexisting with an LTE network in a mobile communication system according to an embodiment of the present disclosure.

With reference to FIG. 9, an operation of an LTE PS legacy CS UE based on the type of a legacy network coexisting with an LTE network in a mobile communication system according to an embodiment of the present disclosure will be described below.

FIG. 9 is a flowchart illustrating an operation of an LTE PS legacy CS UE based on the type of a legacy network coexisting with an LTE network in a mobile communication system according to an embodiment of the present disclosure.

Referring to FIG. 9, upon detection of entry into an LTE area, an LTE PS legacy CS UE performs a combined attach procedure in operation 911 and proceeds to operation 913. A detailed description will be given of the combined attach procedure of the LTE PS legacy CS UE.

For example, the LTE PS legacy CS UE may transmit a message indicating that it supports a 2G/3G scheme and a CSFB/SRVCC procedure to an eNB in an RRC connection establishment procedure or a subsequent procedure for transmitting UE radio capability information. In another example, the LTE PS legacy CS UE may transmit an attach request message including information to an MME indicating that it supports the 2G/3G scheme and the CSFB/SRVCC procedure. The following description is given on the assumption that an LTE PS legacy CS UE may transmit an attach request message to an MME including information indicating that it supports a 2G/3G scheme and a CSFB/SRVCC procedure. The information indicating support of the 2G/3G scheme and the CSFB/SVRCC procedure may be represented, for example, as '2G/3G capability=yes'. Further, the LTE PS legacy CS UE may include information indicating that its usage setting is voice centric in the attach request message.

As the combined attach procedure is performed, the LTE PS legacy CS UE receives an attach accept message in operation 913 and then proceeds to operation 915. The attach accept message may include various parameters. The LTE PS legacy CS UE may determine a voice service support function supported by a network based on the parameters included in the attach accept message, as follows.

The parameters included in the attach accept message may include EPS network feature support information and an EPS attach result IE. The EPS network feature support information may include an IMS VoPS field, which may be represented, for example, in 1 bit. If the IMS VoPS field is set to '1' in the EPS network feature support information, the EPS network feature information indicates that the LTE network supports VoIMS. On the contrary, if the IMS VoPS field is set to '0' in the EPS network feature support information, the EPS network feature information indicates that the LTE network does not support VoIMS. If the EPS attach result IE is set to Combined EPS/IMI, this means that the LTE network supports CSFB. On the contrary, if the EPS attach result IE is set to EPS only, this means that the LTE network does not support CSFB.

In this manner, the LTE PS legacy CS UE may determine whether the LTE network supports VoIMS or CSFB based on the parameters included in the attach accept message and accordingly may receive voice service in VoIMS or CSFB.

In operation 915, the LTE PS legacy CS UE determines whether the LTE network supports VoIMS and CSFB based on the parameters included in the attach accept message according to the usage setting (VoIMS=No and Attach result=EPS Only?). If the LTE network does not support VoIMS and CSFB, the LTE PS legacy CS UE proceeds to operation 917. If information related to the usage setting of the LTE PS legacy CS UE is set to voice centric and the LTE network does not support either of VoIMS and CSFB, the LTE PS legacy CS UE may turn off the LTE function, that is, the function of accessing an E-UTRAN and may access only the 2G/3G network. However, in the embodiment of the present disclosure illustrated in FIG. 9, the LTE PS legacy CS UE proceeds to operation 917.

In operation 917, the LTE PS legacy CS UE detects information about neighbor cells and RATs using a system information block (SIB) received from an eNB and then proceeds to operation 919. While not shown in FIG. 9, the UE may detect information about neighbor cells and RATs using any other method. In operation 919, the LTE PS legacy CS UE may determine whether the type of a legacy network adjacent to or coexisting with the current LTE network is a 2G (for example, a GERAN) network or a 3G (for example, a UTRAN or TD-SCDMA) network. If the type of the legacy network coexisting with the current LTE network is a 2G network, the LTE PS legacy CS UE should operate in LTE PS legacy CS mode. For this purpose, the LTE PS legacy CS UE performs a normal TAU procedure in operation 925. The normal TAU procedure means that the TAU procedure is not a combined-type TAU procedure. Now the normal TAU procedure will be described below in detail.

If the LTE network does not support either of VoIMS and CSFB, the LTE PS legacy CS UE should operate in the LTE PS legacy CS mode. For example, referring to FIG. 2, if a non-VoLTE area overlaps with a CSFB-unavailable 2G area, the LTE network does not support either of VoIMS and CSFB. That is, the LTE PS legacy CS UE should receive CS service through the 2G network, while receiving PS service through the LTE network.

However, because the LTE PS legacy CS UE has already notified the eNB that it supports 2G/3G capability during the combined attach procedure in operation 911, if the LTE network switches or hands over the LTE PS legacy CS UE to the 2G/3G network, the LTE PS legacy CS UE may no longer use the LTE network.

If the LTE PS legacy CS UE operates in the LTE PS legacy CS mode, the LTE PS legacy CS UE may access the 2G/3G network and, thus, there is no need for accepting a command indicating switching or HO to the 2G/3G network through the LTE network.

Therefore, since the LTE network does not support VoIMS and CSFB, the LTE PS legacy CS UE performs the normal TAU procedure if it has to operate in the LTE PS legacy CS mode. In this case, the LTE PS legacy CS UE sets an EPS update type IE to 'TA updating' (EPS update type IE=TA updating) in a TAU request message during the normal TAU procedure. In addition, the LTE PS legacy CS UE should not include information indicating support of 2G/3G capability or CSFB/SRVCC in the TAU request message (2G/3G capability=no) in the normal TAU procedure. The LTE PS legacy CS UE should also indicate that its usage setting is data centric to the network by the TAU request message. Thus, the LTE PS legacy CS UE may prevent the LTE network from switching or handing over the LTE PS legacy CS UE to the 2G/3G network by the above normal TAU procedure.

After the normal TAU procedure, the LTE PS legacy CS UE performs a CS registration procedure using its 2G/3G controller in operation 923. The CS registration procedure is performed to provide the CS service through the 2G/3G network, involving, for example, an attach procedure or a location area update procedure. The attach procedure of the LTE network and the registration procedure of the 2G/3G network may be performed in a reverse order or in parallel.

On the other hand, if the type of the legacy network coexistent with the LTE network is a 3G network in operation 919, the LTE PS legacy CS UE may simultaneously receive voice (CS) service and PS data service through the 3G network instead of the afore-described LTE PS legacy CS mode. For this purpose, the LTE PS legacy CS UE performs the normal TAU procedure in operation 921 and then proceeds to operation 923. The normal TAU procedure means that the TAU procedure is not a combined-type TAU procedure. Now the normal TAU procedure will be described below in detail.

If the LTE network does not support either of VoIMS and CSFB and the LTE PS legacy CS UE starts a voice call, the LTE PS legacy CS UE should perform an operation for receiving the CS service and the PS service through the 3G network. For example, referring back to FIG. 2, if a non-VoLTE area overlaps with a CSFB-unavailable 2G area, the LTE network does not support either of VoIMS and CSFB.

However, since the LTE PS legacy CS UE has already notified the eNB that its usage setting is voice centric during the combined attach procedure in operation 911, the LTE PS legacy CS UE may not prevent the network from configuring the LTE PS legacy CS UE to use the 2G or 3G network instead of the LTE network.

Therefore, if the LTE PS legacy CS UE is aware that the LTE network does not support VoIMS and CSFB and an adjacent/coexisting legacy network is a 3G network, the LTE PS legacy CS UE performs the normal TAU procedure. In this case, the LTE PS legacy CS UE sets the EPS update type IE to 'TA updating' (EPS update type IE=TA updating) in the TAU request message during the normal TAU procedure. In addition, the LTE PS legacy CS UE may indicate support of 2G/3G capability to the network in the TAU request message (2G/3G=yes) in the normal TAU procedure. The LTE PS legacy CS UE should also indicate that its usage setting is data centric to the network by the TAU request message. Thus, the LTE PS legacy CS UE may prevent the LTE network from switching or handing over the LTE PS legacy CS UE to the 2G/3G network by the above normal TAU procedure.

After the normal TAU procedure, the LTE PS legacy CS UE performs the CS registration procedure using its 2G/3G controller in operation 923. The CS registration procedure is performed to provide the CS service through the 2G/3G network, involving, for example, an attach procedure or a location area update procedure. The attach procedure of the LTE network and the registration procedure of the 2G/3G network may be performed in a reverse order or in parallel.

While it has been described with reference to FIG. 9 that an LTE PS legacy CS UE performs an initial combined attach procedure in an LTE network, the operation for determining a registration procedure type according to whether a network supports voice service by an LTE PS legacy CS UE in a mobile communication system according to the embodiment of the present disclosure illustrated in FIG. 9 may be applied without any great modification even though the UE performs a combined TAU procedure after an attach procedure. In this case, the LTE PS legacy CS UE may change an attach request message to a TAU request message instead of and a packet switched telephone network (PSTN) emulation system (PES) update type IE to combined TA/LA updating in FIG. 9.

In the embodiment of FIG. 9 and other related embodiments of the present disclosure, an LTE PS legacy CS UE performs a different operation according to a cell adjacent to or coexisting with an LTE network. Therefore, when a voice call starts later, an operation of the LTE PS legacy CS UE should be different depending on whether an adjacent cell is included in a 2G network or a 3G network.

If the type of the adjacent/coexistent cell is a 2G cell, the LTE PS legacy CS UE, having been aware of the start of the voice call, should operate in the afore-described LTE PS legacy CS mode. For example, when the LTE PS legacy CS UE requests an outgoing call or receives information indicating generation of an incoming call, for example, a paging message from the network, the LTE PS legacy CS UE is aware that a voice call has started.

Therefore, the LTE PS legacy CS UE performs a voice call setup operation with the 2G network through the 2G/3G controller, while receiving the PS service through the LTE network.

On the other hand, if the type of the adjacent/coexistent cell is a 3G cell, the LTE PS legacy CS UE aware of the start of the voice call may receive PS data service simultaneously with reception of voice service by CS through the 3G network.

Therefore, the LTE PS legacy CS UE may request CS call setup through the 2G/3G controller and perform an RAU procedure. When the LTE PS legacy CS UE transmits an RAU request message through the 3G network, an SGSN changes a PS data transmission path from the LTE network to the 3G network. Subsequently, the LTE PS legacy CS UE may transmit and receive PS data through the 3G network. Herein, a similar situation to those illustrated in FIGS. 5 and 6 may occur. That is, the SGSN of the 3G network may request a context to an MME even though the LTE PS legacy CS UE is in connected mode in the LTE network.

To prevent this situation, the SGSN and the MME may exchange their roles in operations 539, 541, 543, and 547 of FIG. 5 or operations 635, 637, 639, and 641 of FIG. 6.

In an embodiment of the present disclosure, determining whether the type of a cell is a 2G or 3G cell means determining whether 2G RAT or 3G RAT is applied to the cell.

While FIG. 9 illustrates an operation of an LTE PS legacy CS UE according to the type of a legacy network coexisting with an LTE network in a mobile communication system according to an embodiment of the present disclosure, many modifications can be made to FIG. 9. For example, while the operations are sequential in FIG. 9, they may be overlapped or may be performed in parallel, in a different order, or a plurality of times.

If the UE transmits a TAU request message to the LTE network to receive data service during HO to the legacy network due to the SRVCC procedure, the SRVCC procedure may be canceled in view of the TAU procedure, which will be described below in detail.

Only when the MME receives an SRVCC PS to CS Complete Notification (or acknowledgement (Ack)) message from an MSC during the SRVCC procedure, the MME may be aware that the UE has successfully performed HO to the legacy network. However, if the MME receives the TAU request message from the UE before receiving the SRVCC PS to CS Complete Notification message from the MSC, the MME determines that the HO of the UE to the legacy network has failed. Therefore, the MME may transmit an SRVCC PS to CS Cancel Notification message to the MSC to cancel the SRVCC procedure.

Accordingly, an embodiment of the present disclosure provides methods for avoiding the above situation, that is, first, second, and third methods, which will be described below.

In the first method, if a UE performs HO to a legacy network by SRVCC, a TAU procedure performed for the UE to continuously receive data service in an LTE network is delayed by a predetermined time. Various methods are available to delay the TAU procedure by the predetermined time. It is assumed in the embodiment of the present disclosure that the TAU procedure is delayed by the predetermined time using a timer, for example.

Now, a description will be given of an operation of a UE for controlling a TAU request using a timer in a mobile communication system according to an embodiment of the present disclosure.

Figure 10:
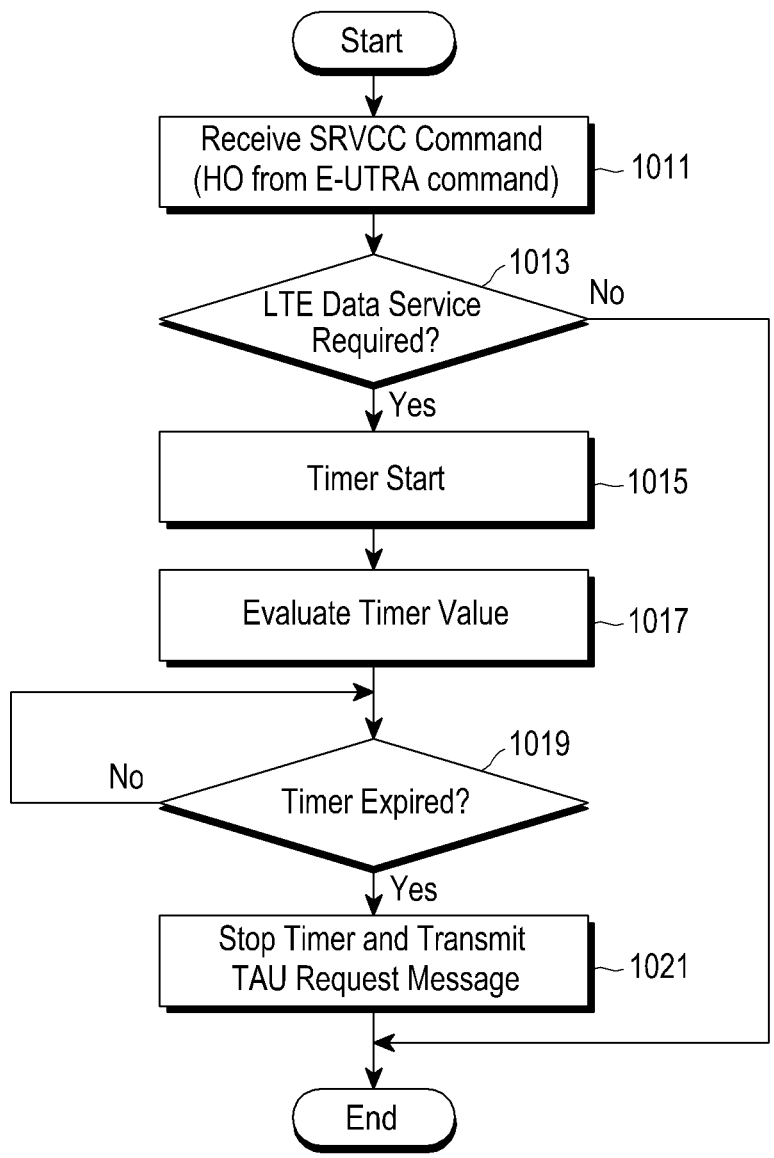
FIG. 10 is a flowchart illustrating an operation for controlling a TAU request message based on a timer by a UE in a mobile communication system according to an embodiment of the present disclosure.

FIG. 10 is a flowchart illustrating an operation of a UE for controlling a TAU request using a timer in a mobile communication system according to an embodiment of the present disclosure.

Referring to FIG. 10, the UE receives a message including an HO command, for example, a HO from EUTRA Command indicating HO to a legacy network, for a SRVCC procedure from an LTE network (eNB) in operation 1011. In operation 1013, the UE determines whether there is a need for receiving data service from the LTE network simultaneously with receiving a service from the legacy network by the SRVCC procedure. If there is a need for receiving the data service from the LTE network simultaneously with receiving the service from the legacy network by the SRVCC procedure, the UE proceeds to operation 1015.

In operation 1015, the UE starts a predetermined timer and proceeds to operation 1017. The timer is used to determine a time to transmit a TAU request message during the SRVCC procedure. The start time of the timer may be changed according to a system situation of the mobile communication system and the start time of the timer may be determined based on various parameters. Herein, the parameters used to determine the time to start the timer will not be described in detail herein.

The UE continuously evaluates the timer in operation 1017 and proceeds to operation 1019.

The UE determines if the timer has expired in operation 1019. Upon expiration of the timer, the UE proceeds to operation 1021. If the timer is still running, the UE returns to repeat the operation 1019. Expiration of the timer may mean that the value of the timer is equal to or larger than a predetermined value.

After the timer expires in operation 1019, the UE stops the timer and receives the data service from the LTE network (i.e., a TAU procedure) in operation 1021. More specifically, the UE generates a TAU request message and transmits the TAU request message to an MME. If an RRC connection has already been released, the UE may first perform an RRC connection establishment procedure to transmit the TAU request message.

While FIG. 10 illustrates an operation of a UE for controlling a TAU request based on a timer in a mobile communication system according to an embodiment of the present disclosure, many modifications can be made to FIG. 10. For example, while the operations are sequential in FIG. 10, they may be overlapped or may be performed in parallel, in a different order, or a plurality of times.

Now, a detailed description will be given of the second method.

In the second method, only when a UE confirms that an RRC connection has been released from an LTE network, the UE performs a TAU procedure to receive data service from the LTE network. This is because only when an MME receives an SRVCC PS to CS Completion Notification message from an MSC, the MME performs an S1 (or UE Context) release procedure and an eNB releases an RRC connection to the UE during this procedure.

Accordingly, if the UE reestablishes an RRC connection and transmits a TAU message after confirming release of the RRC connection, the UE may prevent the MME from transmitting an SRVCC PS to CS Cancel Notification message to the MSC.

Now, a description will be given of an operation of a UE for controlling transmission of a TAU request message according to an RRC connection state in a mobile communication system according to an embodiment of the present disclosure.

Figure 11:
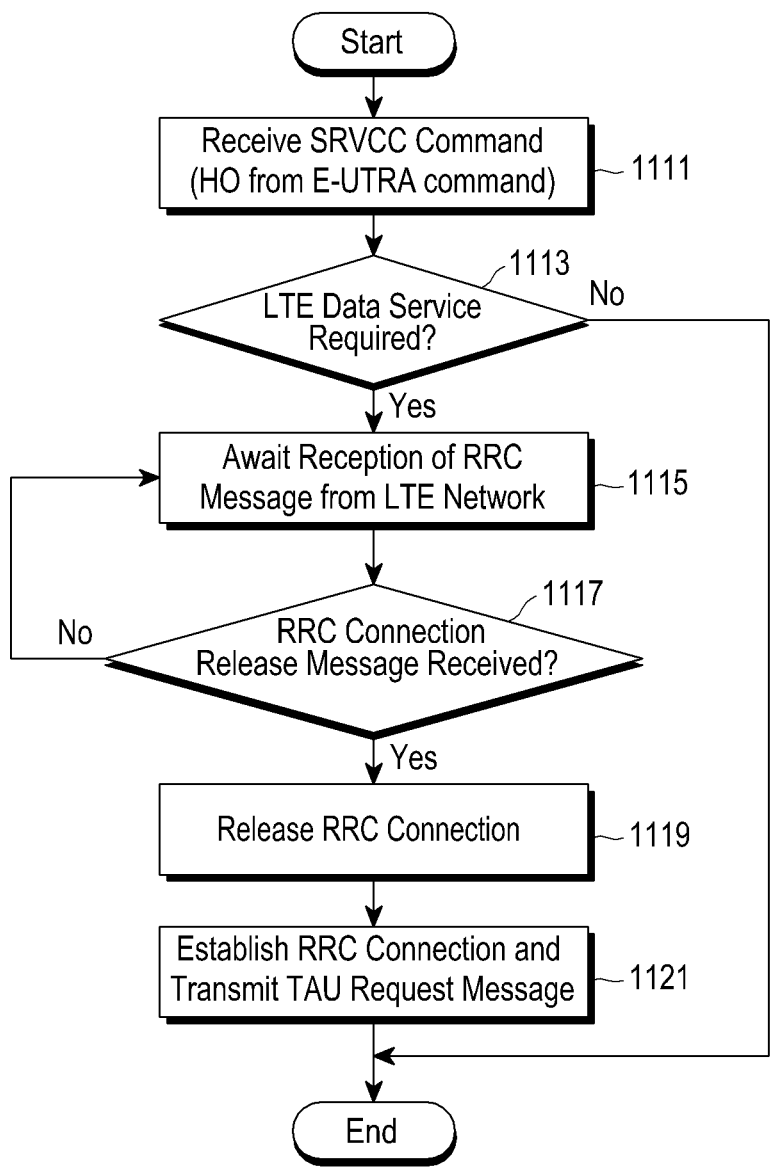
FIG. 11 is a flowchart illustrating an operation for controlling transmission of a TAU request message according to a radio resource control (RRC) connected state by a UE in a mobile communication system according to an embodiment of the present disclosure.

FIG. 11 is a flowchart illustrating an operation of a UE for controlling transmission of a TAU request message according to an RRC connection state in a mobile communication system according to an embodiment of the present disclosure.

Referring to FIG. 11, the UE receives a message including an HO command, for example, a HO from EUTRA command indicating HO to a legacy network, for an SRVCC procedure from an eNB in operation 1111 and then proceeds to operation 1113.

In operation 1113, the UE determines whether there is a need for receiving data service from the LTE network simultaneously with receiving a service from the legacy network by the SRVCC procedure. If there is a need for receiving the data service from the LTE network simultaneously with receiving the service from the legacy network by the SRVCC procedure, the UE proceeds to operation 1115.

In operation 1115, the UE awaits reception of an RRC message from the LTE network and proceeds to operation 1117.

The UE determines whether an RRC connection release message has been received from the LTE network in operation 1117. Upon receipt of the RRC connection release message, the UE proceeds to operation 1119.

The UE performs an RRC connection release operation according to the RRC connection release message in operation 1119 and proceeds to operation 1121.

In operation 1121, the UE performs an operation for continuously receiving the data service from the LTE network, that is, a TAU procedure. Since an RRC connection has already been released by the RRC connection release operation in operation 1119, the UE may first perform an RRC connection establishment procedure to transmit the TAU request message.

While FIG. 11 illustrates an operation of a UE for controlling transmission of a TAU request message according to an RRC connection state in a mobile communication system according to an embodiment of the present disclosure, many modifications can be made to FIG. 11. For example, while the operations are sequential in FIG. 11, they may be overlapped or may be performed in parallel, in a different order, or a plurality of times.

The third method will be described below in detail.

In the third method, after a UE transmits an RRC connection reestablishment request message to an LTE network, the UE selects an operation according to a response from the LTE network.

If RRC connection reestablishment is successful, this means that an MME and an eNB have not performed a UE context release procedure. Therefore, the UE transmits a TAU request message after explicitly receiving an RRC connection release command from the eNB.

However, if the RRC connection reestablishment failed, the MME and the eNB have already released a UE context and an RRC connection. Therefore, the UE may transmit a TAU request message immediately. This is because only when the MME receives an SRVCC PS to CS Complete Notification message from an MSC, the MME performs an S1 (or UE Context) release procedure with the eNB and the eNB releases an RRC connection to the UE during the S1 (or UE Context) release procedure.

Accordingly, if the UE reestablishes an RRC connection and transmits a TAU request message after checking an RRC connection state of the LTE network by explicitly transmitting the RRC reestablishment request message, the UE may prevent the MME from transmitting an SRVCC PS to CS Cancel Notification message to the MSC.

Figure 12:
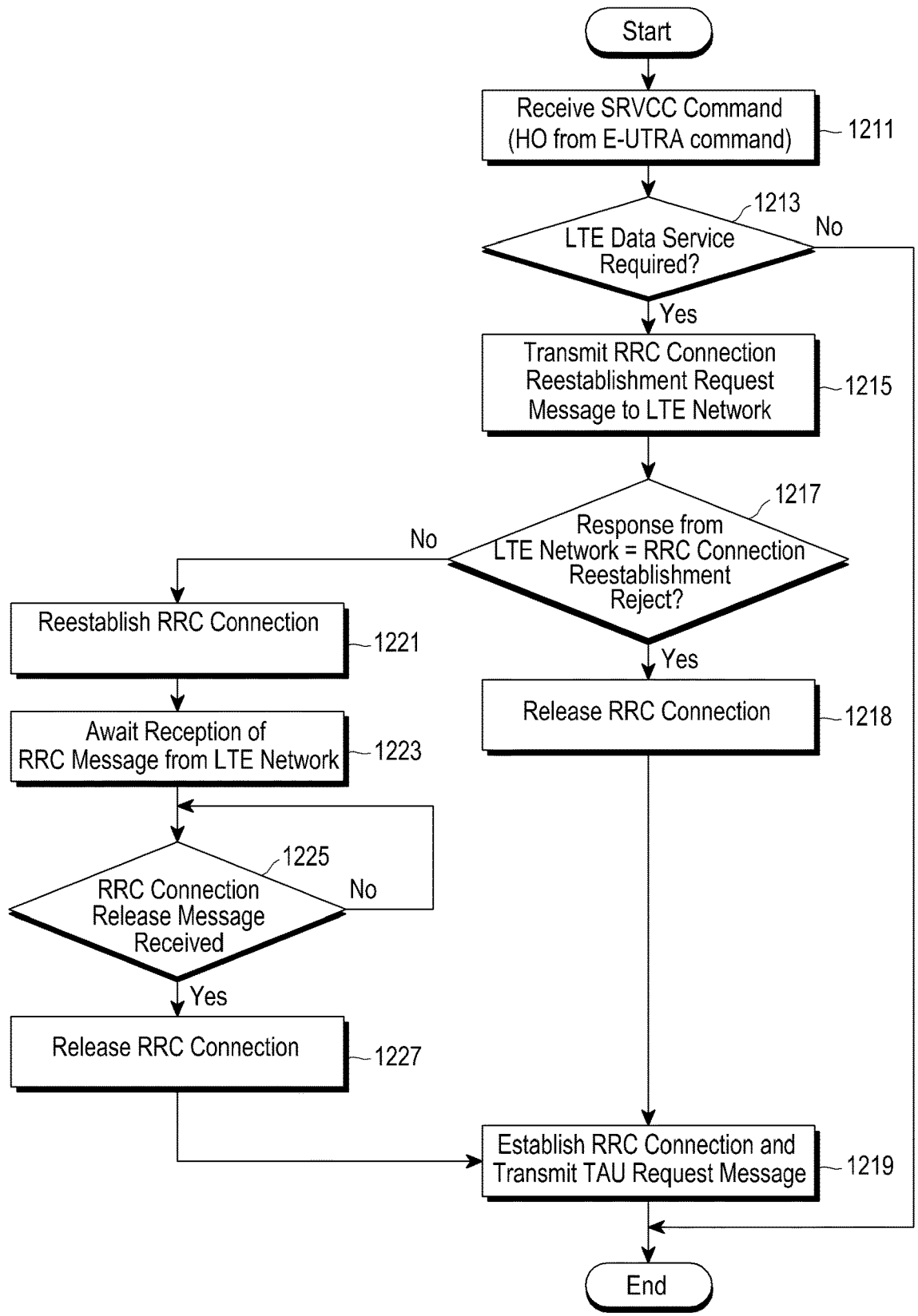
FIG. 12 is a flowchart illustrating an operation for performing an RRC connection reestablishment procedure and controlling transmission of a TAU request message according to a result of the RRC connection reestablishment procedure by a UE in a mobile communication system according to an embodiment of the present disclosure.

With reference to FIG. 12, a description will be given of an operation of a UE for performing an RRC connection reestablishment procedure and controlling transmission of a TAU request message according to a result of the RRC connection reestablishment procedure in a mobile communication system according to an embodiment of the present disclosure.

FIG. 12 is a flowchart illustrating an operation for performing an RRC connection reestablishment procedure and controlling transmission of a TAU request message according to a result of the RRC connection reestablishment procedure in a mobile communication system according to an embodiment of the present disclosure.

Referring to FIG. 12, the UE receives a message including an HO command, for example, a HO from EUTRA command indicating HO to a legacy network, for an SRVCC procedure from an eNB in operation 1211 and the proceeds to operation 1213.

In operation 1213, the UE determines whether there is a need for receiving data service from the LTE network simultaneously with receiving a service from the legacy network by the SRVCC procedure. If there is a need for receiving the data service from the LTE network simultaneously with receiving the service from the legacy network by the SRVCC procedure, the UE proceeds to operation 1215.

In operation 1215, the UE transmits an RRC connection reestablishment request message to the LTE network and then proceeds to operation 1217.

The UE receives an RRC message from the LTE network and determines whether the received RRC message is an RRC connection reestablishment reject message in operation 1217. If the received RRC message is an RRC connection reestablishment reject message, the UE proceeds to operation 1218. However, if the received RRC message in operation 1217 is not an RRC connection reestablishment reject message (e.g., an RRC connection reestablishment message), the UE proceeds to operation 1221.

If the UE has received the RRC connection reestablishment rejection message in operation 1217, the UE releases an RRC connection in operation 1218 and proceeds to operation 1219.

If the UE has received the RRC connection reestablishment message in operation 1217, the UE performs an RRC connection reestablishment procedure in operation 1221 and proceeds to operation 1223.

The UE awaits reception of an RRC command from the LTE network in operation 1223 and determines whether an RRC connection release message has been received from the LTE network in operation 1225. Upon receipt of the RRC connection release message in operation 1225, the UE proceeds to operation 1227.

The UE performs the RRC connection release procedure in operation 1227 and then proceeds to operation 1219.

In operation 1219, the UE performs an operation for continuously receiving the data service from the LTE network, that is, a TAU procedure. Since the RRC connection was released in operations 1218 and 1227, the UE may first perform the RRC connection establishment procedure to transmit the TAU request message.

While FIG. 12 illustrates an operation of a UE for performing an RRC connection reestablishment procedure and controlling transmission of a TAU request message according to a result of the RRC connection reestablishment procedure in a mobile communication system according to an embodiment of the present disclosure, many modifications can be made to FIG. 12. For example, while the operations are sequential in FIG. 12, they may be overlapped or may be performed in parallel, in a different order, or a plurality of times.

While the first, second, and third methods may be performed separately to avoid the afore-described situation as described above, they may be performed in combination. For example, before transmitting the RRC connection reestablishment request message in operation 1215, the UE may determine whether to perform the RRC connection release procedure by performing operations 1115 and 1117.

In another embodiment, before transmitting the RRC connection reestablishment request message in operation 1215, the UE may perform operations 1015, 1017, and 1019 and determine whether the RRC connection release message has been received by performing operations 1115 and 1117.

Then the UE may perform operation 1215 and the subsequent operations only when the RRC connection release message has not been received until expiration of the timer.

The operation of a UE for performing an RRC connection reestablishment procedure and controlling transmission of a TAU request message according to a result of the RRC connection reestablishment procedure in the mobile communication system according to an embodiment of the present disclosure has been described with reference to FIG. 12. Now a description will be given of the internal structure of an LTE PS legacy CS UE in a mobile communication system according to an embodiment of the present disclosure.

Figure 13:
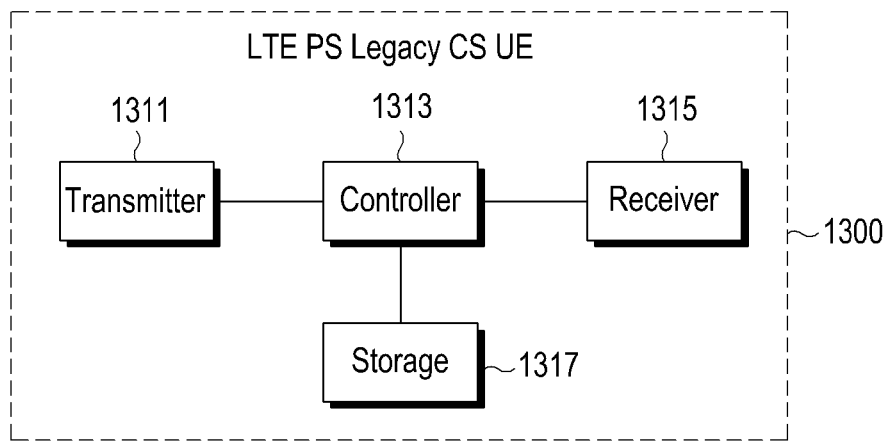
FIG. 13 is a block diagram of an LTE PS legacy CS UE in a mobile communication system according to an embodiment of the present disclosure.

FIG. 13 is a block diagram of an LTE PS legacy CS UE in a mobile communication system according to an embodiment of the present disclosure.

Referring to FIG. 13, an LTE PS legacy CS UE 1300 includes a transmitter 1311, a controller 1313, a receiver 1315, and a storage 1317.

The controller 1313 provides overall control to the LTE PS legacy CS UE 1300. Particularly, the controller 131 controls the LTE PS legacy CS UE 1300 to perform operations for providing voice service and data service. The operations for providing voice service and data service performed by the LTE PS legacy CS UE 1300 have been described before with reference to FIGS. 2 to 12 and thus will not be described in detail herein to avoid redundancy.

The transmitter 1311 transmits various signals and messages to other entities under the control of the controller 1313. The transmitter 1311 may include a radio frequency (RF) transmitter for upconverting the frequency of a transmission signal and amplifying the upconverted transmission signal. The transmitter 1311 may transmit a signal output from the controller 1313 on a radio channel.

The receiver 1315 receives various signals and messages from other entities under the control of the controller 1313. The receiver 1315 may include an RF receiver for low-noise-amplifying a received signal and downconverting the frequency of the low-noise-amplified received signal. The receiver 1315 outputs a signal received on a radio channel to the controller 1313.

The storage 1317 stores programs and data required to perform the operations for providing voice service and data service described before with reference to FIGS. 2 and 12 and data generated during the operations for providing voice service and data service described before with reference to FIGS. 2 and 12.

While the transmitter 1311, the controller 1313, the receiver 1315, and the storage 1317 are shown in FIG. 13 as separately configured in the LTE PS legacy CS UE 1300 by way of example, it is to be clearly understood that at least one of the transmitter 1311, the controller 1313, the receiver 1315, and the storage 1317 may be incorporated with another component in the LTE PS legacy CS UE 1300. For example, the transmitter 1311 and receiver 1315 may be combined into a transceiver.

The LTE PS legacy CS UE 1300 may include an LTE transmitter, an LTE controller, an LTE receiver, a legacy transmitter, a legacy controller, and a legacy receiver, and may include an integrated controller for controlling the LTE controller and the legacy controller in an integrated manner. For example, if the LTE PS legacy CS UE 1300 operates in LTE PS legacy CS mode, the integrated controller may command the LTE controller to perform a TAU procedure and at the same time, may command the legacy controller to perform a CS attach procedure or a TAU procedure. If the LTE PS legacy CS UE 1300 is connected to a CSFB-available network, the integrated controller may command the legacy controller to turn off the legacy transmitter and the legacy receiver.

Figure 14:
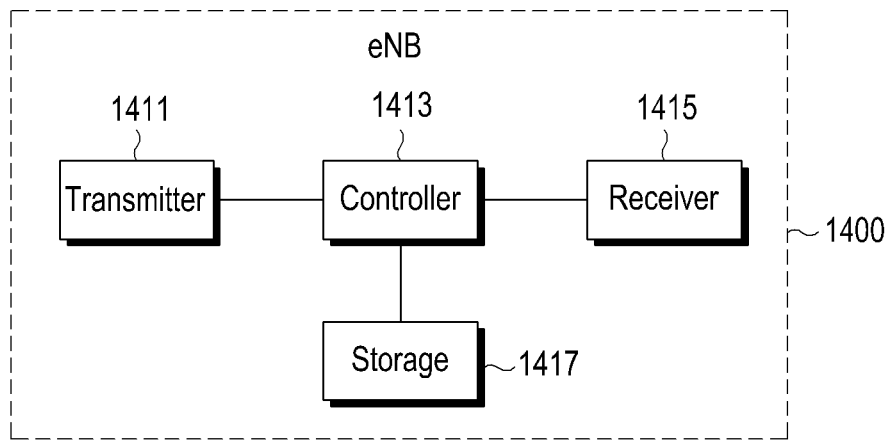
FIG. 14 is a block diagram of an evolved node B (eNB) in a mobile communication system according to an embodiment of the present disclosure.

The internal structure of an LTE PS legacy CS UE in a mobile communication system according to an embodiment of the present disclosure has been described above with reference to FIG. 13. With reference to FIG. 14, the internal structure of an eNB in a mobile communication system according to an embodiment of the present disclosure will be described below.

FIG. 14 is a block diagram of an eNB in a mobile communication system according to an embodiment of the present disclosure.

Referring to FIG. 14, an eNB 1400 includes a transmitter 1411, a controller 1413, a receiver 1415, and a storage 1417.

The controller 1413 provides overall control to the eNB 1400. Particularly, the controller 1413 controls the eNB 1400 to perform operations for providing voice service and data service. The operations for providing voice service and data service performed by the eNB 1400 have been described before with reference to FIGS. 2 to 12 and thus will not be described in detail herein to avoid redundancy.

The transmitter 1411 transmits various signals and messages to other entities under the control of the controller 1413.

The receiver 1415 receives various signals and messages from other entities under the control of the controller 1413.

The storage 1417 stores programs and data required to perform the operations for providing voice service and data service described before with reference to FIGS. 2 and 12 and data generated during the operations for providing voice service and data service described before with reference to FIGS. 2 and 12.

While the transmitter 1411, the controller 1413, the receiver 1415, and the storage 1417 are shown in FIG. 14 as separately configured in the eNB 1400 by way of example, it is to be clearly understood that at least one of the transmitter 1411, the controller 1413, the receiver 1415, and the storage 1417 may be incorporated with another component in the eNB 1400.

Figure 15:
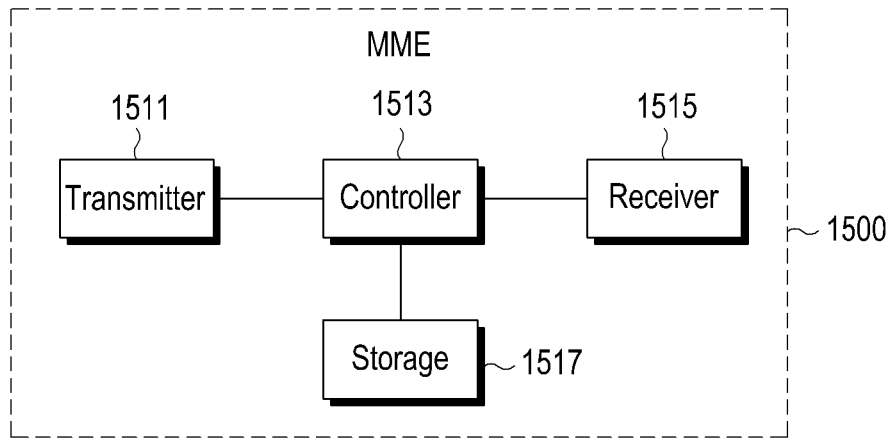
FIG. 15 is a block diagram of a mobility management entity (MME) in a mobile communication system according to an embodiment of the present disclosure.

The internal structure of an eNB in a mobile communication system according to an embodiment of the present disclosure has been described above with reference to FIG. 14. With reference to FIG. 15, the internal structure of an MME in a mobile communication system according to an embodiment of the present disclosure will be described below.

FIG. 15 is a block diagram of an MME in a mobile communication system according to an embodiment of the present disclosure.

Referring to FIG. 15, an MME 1500 includes a transmitter 1511, a controller 1513, a receiver 1515, and a storage 1517.

The controller 1513 provides overall control to the MME 1500. Particularly, the controller 1513 controls the MME 1500 to perform operations for providing voice service and data service. The operations for providing voice service and data service performed by the MME 1500 have been described before with reference to FIGS. 2 to 12 and thus will not be described in detail herein to avoid redundancy. The controller 1513 may control the MME 1500 to generate CS security-related information when a CSFB procedure is triggered from the LTE PS legacy CS UE and, thus, an expanded service request message is received from the LTE PS legacy CS UE.

The transmitter 1511 transmits various signals and messages to other entities under the control of the controller 1513. The transmitter 1511 may include an interface unit for executing a signal processing function for wired communication.

The receiver 1515 receives various signals and messages from other entities under the control of the controller 1513.

The storage 1517 stores programs and data required for the MME 1500 to perform the operations for providing voice service and data service described before with reference to FIGS. 2 and 12 and data generated during the operations for providing voice service and data service described before with reference to FIGS. 2 and 12.

While the transmitter 1511, the controller 1513, the receiver 1515, and the storage 1517 are shown in FIG. 15 as separately configured in the MME 1500 by way of example, it is to be clearly understood that at least one of the transmitter 1511, the controller 1513, the receiver 1515, and the storage 1517 may be incorporated with another component in the MME 1500.

Figure 16:
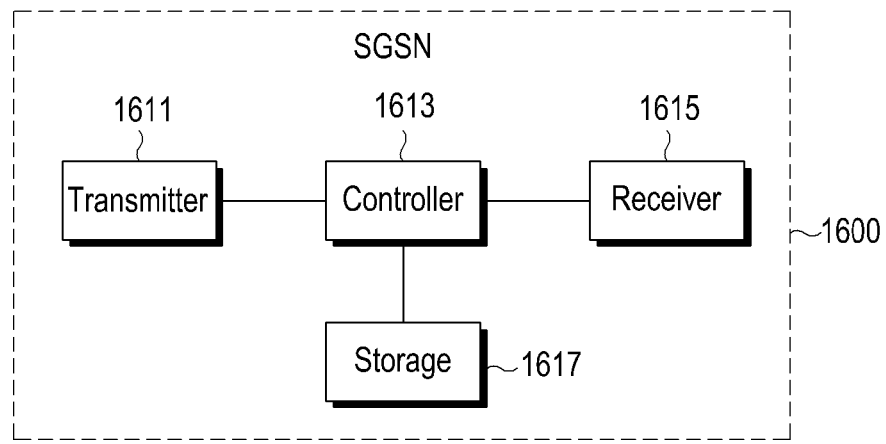
FIG. 16 is a block diagram of a serving general packet radio service (GPRS) support node (SGSN) in a mobile communication system according to an embodiment of the present disclosure.

The internal structure of an MME in a mobile communication system according to an embodiment of the present disclosure has been described above with reference to FIG. 15. With reference to FIG. 16, the internal structure of an SGSN in a mobile communication system according to an embodiment of the present disclosure will be described below.

FIG. 16 is a block diagram of an SGSN in a mobile communication system according to an embodiment of the present disclosure.

Referring to FIG. 16, an SGSN 1600 includes a transmitter 1611, a controller 1613, a receiver 1615, and a storage 1617.

The controller 1613 provides overall control to the SGSN 1600. Particularly, the controller 1613 controls the SGSN 1600 to perform operations for providing voice service and data service. The operations for providing voice service and data service performed by the SGSN 1600 have been described before with reference to FIGS. 2 to 12 and thus will not be described in detail herein to avoid redundancy.

The transmitter 1611 transmits various signals and messages to other entities under the control of the controller 1613.

The receiver 1615 receives various signals and messages from other entities under the control of the controller 1613.

The storage 1617 stores programs and data required for the SGSN 1600 to perform the operations for providing voice service and data service described before with reference to FIGS. 2 and 12 and data generated during the operations for providing voice service and data service described before with reference to FIGS. 2 and 12.

While the transmitter 1611, the controller 1613, the receiver 1515, and the storage 1617 are shown in FIG. 16 as separately configured in the SGSN 1600 by way of example, it is to be clearly understood that at least one of the transmitter 1611, the controller 1613, the receiver 1615, and the storage 1617 may be incorporated with another component in the SGSN 1600.

Figure 17:
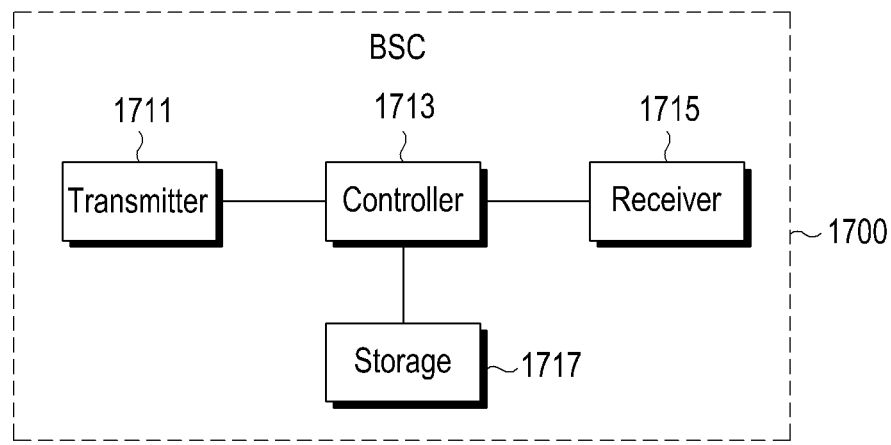
FIG. 17 is a block diagram of a base station controller (BSC) in a mobile communication system according to an embodiment of the present disclosure.

The internal structure of an SGSN in a mobile communication system according to an embodiment of the present disclosure has been described above with reference to FIG. 16. With reference to FIG. 17, the internal structure of a BSC in a mobile communication system according to an embodiment of the present disclosure will be described below.

FIG. 17 is a block diagram of a BSC in a mobile communication system according to an embodiment of the present disclosure.

Referring to FIG. 17, a BSC 1700 includes a transmitter 1711, a controller 1713, a receiver 1715, and a storage 1717.

The controller 1713 provides overall control to the BSC 1700. Particularly, the controller 1713 controls the BSC 1700 to perform operations for providing voice service and data service. The operations for providing voice service and data service performed by the BSC 1700 have been described before with reference to FIGS. 2 to 12 and thus will not be described in detail herein to avoid redundancy.

The transmitter 1711 transmits various signals and messages to other entities under the control of the controller 1713.

The receiver 1715 receives various signals and messages from other entities under the control of the controller 1713.

The storage 1717 stores programs and data required for the BSC 1700 to perform the operations for providing voice service and data service described before with reference to FIGS. 2 and 12 and data generated during the operations for providing voice service and data service described before with reference to FIGS. 2 and 12.

While the transmitter 1711, the controller 1713, the receiver 1715, and the storage 1717 are shown in FIG. 17 as separately configured in the BSC 1700 by way of example, it is to be clearly understood that at least one of the transmitter 1711, the controller 1713, the receiver 1715, and the storage 1717 may be incorporated with another component in the BSC 1700.

As is apparent from the foregoing description, an embodiment of the present disclosure enables service reception by adaptive selection of an access network through which voice service and data service will be received in a mobile communication system.

An embodiment of the present disclosure enables service provisioning by differentiating an access network through which a UE will receive voice service from an access network through which the UE will receive data service in a mobile communication system.

Since a service can be provided by adaptive selection of an access network through which voice service and data service are received or a UE can receive a service by differentiating an access network through which voice service will be received from an access network through which data service will be received, service quality can be increased.

Further, since a UE can receive data service continuously from an LTE network even after switching to a 2G/3G network due to an SRVCC procedure according to an embodiment of the present disclosure, the quality of service provided to the UE can be increased.

The present disclosure may be implemented as computer-readable code that can be written on a computer-readable recording medium. The computer-readable recording medium may be any type of recording device in which data is stored in a computer-readable manner. Examples of the computer-readable recording medium include a read only memory (ROM), a random access memory (RAM), a compact disc ROM (CD-ROM), a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the various embodiments herein can be construed by one of ordinary skill in the art.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. User equipment (UE) for providing a service in a mobile communication system, the UE comprising:
 a circuit switched (CS) transceiver;
 a packet switched (PS) transceiver;
 at least one CS processor coupled to the CS transceiver; and
 at least one PS processor coupled to the PS transceiver, wherein the at least one PS processor is configured to:
  perform a combined attach procedure associated with a first network and
 a second network,
  control the PS transceiver to receive, from the first network, an attach accept message including parameters comprising voice over internet protocol multimedia subsystem (VoIMS) information comprising a VoIMS field indicating whether a VoIMS service is supported and attach result information indicating whether Circuit Switched Fall Back (CSFB) is supported, wherein the VoIMS service is not supported in case that a value of the VoIMS field is 0, and the VoIMS service is supported in case that the value of the VoIMS field is 1,
  determine, based on the parameters, whether the first network supports the VoIMS service and the Circuit Switched Fall Back (CSFB), and in case that the first network does not support the VoIMS service and the CSFB:
   control the PS transceiver to transmit, to the first network, a message indicating that the UE does not have a capability to support the second network for preventing the first network from handing over the UE to the second network, while performing a normal tracking area update (TAU) procedure,
   wherein the at least one CS processor is configured to perform a circuit switched (CS) attach procedure associated with the second network and control the CS transceiver to receive a CS service from the second network, and
   wherein though a single radio voice call continuity (SRVCC) procedure with a dual transfer mode (DTM) handover is performed and the UE is tuned to the second network, the PS transceiver is not turned off and the at least one PS processor receives a packet switched (PS) service from the first network.

2. The UE of claim 1, wherein the first network includes a long term evolution (LTE) network capable of providing the PS service and the second network includes a 2nd generation/3rd generation (2G/3G) network capable of providing the CS service.

3. The UE of claim 1, wherein the at least one PS processor is further configured to determine that the CSFB is not supported by the first network in case that the attach result information indicates 'evolved packet system (EPS) only', and determine that the CSFB is supported by the first network in case that the attach result information indicates 'combined EPS'.

4. The UE of claim 1, wherein the at least one PS processor is further configured to:
 detect configuration information related to a single radio voice call continuity (SRVCC) procedure, and
 determine whether to transmit, to the first network, information indicating that the UE supports the second network based on the configuration information.

5. The UE of claim 4, wherein the at least one PS processor is further configured to:
 control the PS transceiver to transmit, to the first network, information indicating that the UE supports the second network in case that an SRVCC service is supported, and
 determine to perform the normal TAU procedure for receiving the PS service from the first network.

6. The UE of claim 1, wherein the at least one PS processor is further configured to perform a re-attach procedure associated with the first network in case of receiving a TAU reject message.

7. A method for providing a service by user equipment (UE) in a mobile communication system, the method comprising:
 performing, by at least one packet switched (PS) processor, a combined attach procedure associated with a first network and a second network;
 receiving, by a PS transceiver from the first network, an attach accept message including parameters comprising voice over internet protocol multimedia subsystem (VoIMS) information comprising a VoIMS field indicating whether a VoIMS service is supported and attach result information indicating whether Circuit Switched Fall Back (CSFB) is supported, wherein the VoIMS service is not supported in case that a value of the VoIMS field is 0, and the VoIMS service is supported in case that the value of the VoIMS field is 1;
 determining, by the at least one PS processor, based on the parameters, whether the first network supports the VoIMS service and the CSFB; and
 in case that the first network does not support the VoIMS service and the CSFB:
  transmitting, by the PS transceiver, to the first network, a message indicating that the UE does not have a capability to support the second network for preventing the first network from handing over the UE to the second network, while performing a normal tracking area update (TAU) procedure; and
  performing, by at least one circuit switched (CS) processor, a CS attach procedure associated with the second network and receiving, by a CS transceiver, a CS service from the second network, and
  receiving, by a PS transceiver, a packet switched (PS) service from the first network which is not turned off, though a single radio voice call continuity (SRVCC) procedure with a dual transfer mode (DTM) handover is performed and the UE is tuned to the second network.

8. The method of claim 7, wherein the first network includes a long term evolution (LTE) network capable of providing the PS service and the second network includes a 2nd generation/3rd generation (2G/3G) network capable of providing the CS service.

9. The method of claim 7, wherein the CSFB is not supported by the first network in case that the attach result information indicates 'evolved packet system (EPS) only', and the CSFB is supported by the first network in case that the attach result information indicates 'combined EPS'.

10. The method of claim 7, wherein the method further comprises:
 detecting, by the at least one PS processor, configuration information related to a single radio voice call continuity (SRVCC) procedure, and determining, by the at least one PS processor, whether to transmit, to the first network based on the configuration information, information indicating that the UE supports the second network.

11. The method of claim 10, wherein the method further comprises:
transmitting, by the PS transceiver, to the first network, information indicating that the UE supports the second network in case that an SRVCC service is supported, and
determining, by the at least one PS processor, to perform the normal TAU procedure for receiving a PS service from the first network.

12. The method of claim 7, wherein the method further comprises performing, by the at least one PS processor, a re-attach procedure associated with the first network in case of receiving a TAU reject message.

\* \* \* \* \*